(12) United States Patent
Volkerink et al.

(10) Patent No.: US 12,381,794 B2
(45) Date of Patent: Aug. 5, 2025

(54) METHOD AND SYSTEM FOR PERFORMING AD HOC DIAGNOSTICS, MAINTENANCE, PROGRAMMING, AND TESTS OF INTERNET OF THINGS DEVICES

(71) Applicant: Trackonomy Systems, Inc., San Jose, CA (US)

(72) Inventors: Hendrik J Volkerink, Palo Alto, CA (US); Ajay Khoche, West San Jose, CA (US)

(*) Notice: Subject to any disclaimer, the term of this patent is extended or adjusted under 35 U.S.C. 154(b) by 0 days.

(21) Appl. No.: 17/544,928

(22) Filed: Dec. 7, 2021

(65) Prior Publication Data

US 2022/0182849 A1 Jun. 9, 2022

Related U.S. Application Data

(60) Provisional application No. 63/150,982, filed on Feb. 18, 2021, provisional application No. 63/134,160, filed on Jan. 5, 2021, provisional application No. 63/122,095, filed on Dec. 7, 2020.

(51) Int. Cl.
| | |
|---|---|
| *H04L 43/04* | (2022.01) |
| *G16Y 40/10* | (2020.01) |
| *H04L 43/0817* | (2022.01) |
| *H04W 24/02* | (2009.01) |
| *H04W 24/10* | (2009.01) |

(52) U.S. Cl.
CPC .............. *H04L 43/04* (2013.01); *G16Y 40/10* (2020.01); *H04L 43/0817* (2013.01); *H04W 24/02* (2013.01); *H04W 24/10* (2013.01)

(58) Field of Classification Search
None
See application file for complete search history.

(56) References Cited

U.S. PATENT DOCUMENTS

| | | | |
|---|---|---|---|
| 9,305,283 B1 | 4/2016 | Lauka et al. | |
| 11,115,732 B2 | 9/2021 | Lucrecio et al. | |
| 2003/0216969 A1 | 11/2003 | Bauer et al. | |
| 2007/0119926 A1 | 5/2007 | Sloan et al. | |
| 2008/0084291 A1 | 4/2008 | Campion et al. | |
| 2018/0039934 A1* | 2/2018 | Mulaosmanovic | G06Q 10/08 |
| 2018/0337803 A1* | 11/2018 | Sauerwein, Jr. | H04L 9/32 |

(Continued)

FOREIGN PATENT DOCUMENTS

| | | |
|---|---|---|
| AU | 2018204317 A1 | 6/2018 |
| AU | 2018250358 A1 | 10/2018 |

(Continued)

OTHER PUBLICATIONS

PCT Application No. PCT/US2021/062287, International Search Report and Written Opinion, dated Mar. 17, 2022, 7 pages.

*Primary Examiner* — Rachel J Hackenberg
*Assistant Examiner* — Emad Siddiqi

(57) ABSTRACT

Disclosed herein is a method and system for performing audits of one or more IOT devices in an IOT system, prior to deployment of the IOT device or during deployment in the field. The audits are used to determine if an IOT device is functional and capable of performing a task assigned to the IOT device. If an audit is failed, the IOT system may determine that the IOT device is defective and needs to be replaced for the respective task. The IOT system remotely initiates the audits, and tracks the status and results of the audits of the IOT devices.

20 Claims, 26 Drawing Sheets

(56) References Cited

U.S. PATENT DOCUMENTS

| | | |
|---|---|---|
| 2018/0369598 A1* | 12/2018 | Newton .................. H04L 67/12 |
| 2019/0037362 A1 | 1/2019 | Nogueira-Nine |
| 2019/0113632 A1 | 4/2019 | Lucrecio et al. |
| 2019/0296979 A1* | 9/2019 | Gupta ..................... G06N 5/025 |
| 2020/0226442 A1* | 7/2020 | Volkerink ............... B32B 37/06 |
| 2020/0265288 A1* | 8/2020 | Volkerink ............. H04W 4/029 |
| 2021/0004409 A1* | 1/2021 | Zamora Duran ..... G06F 16/908 |

FOREIGN PATENT DOCUMENTS

| | | |
|---|---|---|
| CA | 3061878 A1 | 11/2018 |
| CA | 3008512 A1 | 12/2018 |

* cited by examiner

1100  Phases prior to deployment of Tape Node

```
┌─────────────────────────────────────────────────────────────┐
│     Tape node is stored in a container in a storage area    │
│                            1110                             │
└─────────────────────────────────────────────────────────────┘
                               │
                               ▼
┌─────────────────────────────────────────────────────────────┐
│    Container is moved and tape node is retrieved from container │
│                            1120                             │
└─────────────────────────────────────────────────────────────┘
                               │
                               ▼
┌─────────────────────────────────────────────────────────────┐
│     The tape node is separated from a roll, length, or group │
│                            1130                             │
└─────────────────────────────────────────────────────────────┘
                               │
                               ▼
┌─────────────────────────────────────────────────────────────┐
│                 Tape node is mounted on Asset               │
│                            1140                             │
└─────────────────────────────────────────────────────────────┘
                               │
                               ▼
┌─────────────────────────────────────────────────────────────┐
│                Tape node is deployed in the field           │
│                            1150                             │
└─────────────────────────────────────────────────────────────┘
```

FIG. 11

Audit Result Data Table 1670

| Device ID | Reference Device ID | Expected RSSI Range | Measured RSSI | Antenna Health Status |
|---|---|---|---|---|
| 000001 | 200003 | -40dBm to -38dBm | -39.5dBm | Green |
| 000005 | 200003 | -40dBm to -34dBm | -37.2dBm | Green |
| 000015 | 200001 | -40dBm to -38dBm | -41.0dBm | Yellow |
| 003035 | 256678 | -37dBm to -38dBm | -99.0dBm | Red |
| 000878 | 300006 | -40dBm to -38dBm | No Signal | Red |
| 000300 | 700001 | -38dBm to -33dBm | -34.0dBm | Green |
| 002200 | 703304 | -34dBm to -30dBm | -15.0dBm | Red |
| 011111 | 902301 | -38dBm to -33dBm | Waiting | Deferred Result |

```
Request an audit of a tape node in a work flow, the audit associated
with a task assigned to the tape node
1982
            │
            ▼
Receive notification that the audit result is not currently ready
1984
            │
            ▼
Responsive to receiving the notification, assign the tape node a
deferred status without disrupting the workflow and log the status in a
database
1986
            │
            ▼
(Optional) Place an asset associated with the tape node in a waiting
queue
1988
            │
            ▼
Receive results of the audit at a later time
1990
            │
            ▼
       Did tape node pass
       diagnostics tests
       corresponding to assigned
       task?
   YES ◄──────────────────► NO
   │                              │
   ▼                              ▼
Update the tape node's status to green   Update the tape node's status to red
status and log the updated status in the  status and interrupt workflow to replace
database                                  the tape node
1992                                      1994
            │                 │
            ▼                 ▼
Transmit notification to user of IOT system
1996
```

FIG. 19B

METHOD AND SYSTEM FOR PERFORMING AD HOC DIAGNOSTICS, MAINTENANCE, PROGRAMMING, AND TESTS OF INTERNET OF THINGS DEVICES

CROSS-REFERENCE TO RELATED APPLICATIONS

This application claims priority to U.S. Provisional Patent Application No. 63/122,095, filed on Dec. 7, 2020, to U.S. Provisional Patent Application No. 63/134,160, filed on Jan. 5, 2021, and to U.S. Provisional Patent Application No. 63/150,982, filed on Feb. 18, 2021, all of which are hereby incorporated in their entirety.

FIELD OF THE DISCLOSURE

This disclosure generally relates to wireless internet of things (IOT) devices.

BACKGROUND

When using a large network of wireless internet of things (IOT) devices in an IOT system, IOT devices that are defective may not be suitable for deployment in the field. When deploying a large number of IOT devices (e.g., hundreds or thousands of IOT devices), it is difficult to identify the defective IOT devices before or during deployment. Deploying a defective IOT device may result in costly failure to perform functions with the IOT system. For example, if the IOT system is being used to track assets by deploying wireless tracking devices (i.e., the wireless IOT devices), deploying defective wireless tracking devices may result in the inability to track sensitive or important assets.

SUMMARY

Disclosed herein is a method and system for performing audits of one or more IOT devices in an IOT system, prior to deployment of the IOT device or during deployment in the field. In some embodiments the IOT devices are tape nodes or embodiments of an adhesive tape platform. The audits are used to determine if an IOT device is functional and capable of performing a task assigned to the IOT device. If an audit is failed, the IOT system may determine that the IOT device is defective and needs to be replaced for the respective task. The IOT system remotely initiates the audits and tracks the status and results of the audits of the IOT devices. In some embodiments, the audit includes remotely changing settings of the IOT devices, programming the IOT devices, setting parameters of the IOT devices, providing data and/or instructions to the IOT devices, some other function of the IOT devices, or some combination thereof.

Further disclosed herein is a method and system for retrieving results of audits of one or more IOT devices in an IOT system prior to deployment of the IOT device or during deployment in the field. Audits for IOT devices such as tape nodes or other embodiments of an adhesive tape platform are conducted at the end of manufacturing processes or at the end of a first journey. Results from the audits are stored by a cloud or server of the IOT system. The results of these audits may be retrieved at a later time, e.g., at the beginning of a next journey, and used to determine if the IOT device is functional and capable of performing a next task assigned to the IOT device. In some embodiments, users of the IOT system use client devices to retrieve results of the audits from the cloud or server of the IOT system. Based on the retrieved results, the client device determines whether the IOT device is able to perform a required task or journey.

Using the methods and systems disclosed, the deployment of defective IOT devices may be greatly reduced resulting in higher success rates for the IOT system in performing tasks.

BRIEF DESCRIPTION OF THE DRAWINGS

FIG. 11 is a diagram showing a sequence of example phases for a tape node prior to and leading up to the deployment of the tape node, according to some embodiments.

FIG. 16B shows an example data table showing audit results for tape nodes including diagnostic test results for a wireless antenna of each of the tape nodes, according to some embodiments.

FIG. 19B is flow diagram of a method for performing audits on tape nodes associated with assets that are part of a workflow, according to some embodiments.

DETAILED DESCRIPTION

Figure 1A:
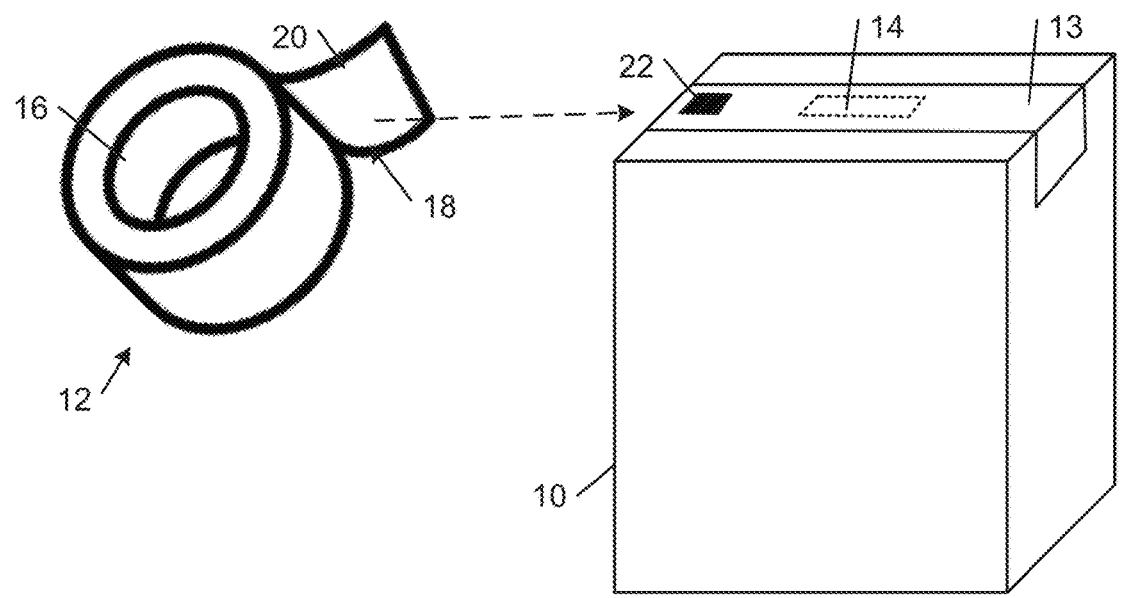
FIG. 1A is a diagrammatic view of an asset that has been sealed for shipment using a segment of an example adhesive tape platform dispensed from a roll, according to some embodiments.

A tracking system is disclosed herein that includes an auditing system for pre-deployment auditing of wireless IOT devices. The tracking devices may each be a wireless IOT device that includes one or more resources, such as wireless communications systems, sensors, batteries, power supplies, computational resources (processor, memory, etc.), and other electronics resources. An audit of a wireless IOT device may include one or more diagnostic tests for each of the resources that the wireless IOT device includes. The auditing system allow for the wireless IOT devices to be audited prior to or at the time of deployment, and the auditing system tracks which wireless IOT devices have failed diagnostic tests. Wireless IOT devices that have failed diagnostic tests that correspond to requirements for an assigned task may be tracked in the auditing system and flagged for replacement in the tracking system. Thus, defective wireless IOT devices that do not meet performance requirements for an assigned task may be efficiently replaced and collected for refurbishment.

In some embodiments, the wireless IOT device is an adhesive tape platform or a segment thereof. The adhesive tape platform includes wireless transducing components and circuitry that perform communication and/or sensing. The adhesive tape platform has a flexible adhesive tape form-factor that allows it to function as both an adhesive tape for adhering to and/or sealing objects and a wireless sensing device.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements and are not drawn to scale.

As used herein, the term "or" refers to an inclusive "or" rather than an exclusive "or." In addition, the articles "a" and "an" as used in the specification and claims mean "one or more" unless specified otherwise or clear from the context to refer the singular form.

The term "tape node" refers to an adhesive tape platform or a segment thereof that is equipped with sensor, processor, memory, energy source/harvesting mechanism, and wireless communications functionality, where the adhesive tape platform (also referred to herein as an "adhesive product" or an "adhesive tape product") has a variety of different form factors, including a multilayer roll or a sheet that includes a plurality of divisible adhesive segments. Once deployed, each tape node can function, for example, as an adhesive tape, label, sticker, decal, or the like, and as a wireless communications device.

The terms "adhesive tape node," "wireless node," or "tape node" may be used interchangeably in certain contexts, and refer to an adhesive tape platform or a segment thereof that is equipped with sensor, processor, memory, energy source/harvesting mechanism, and wireless communications functionality, where the adhesive product has a variety of different form factors, including a multilayer roll or a sheet that includes a plurality of divisible adhesive segments. Once deployed, each tape node or wireless node can function, for example, as an adhesive tape, label, sticker, decal, or the like, and as a wireless communications device. A "peripheral" tape node or wireless node, also referred to as an outer node, leaf node, or terminal node, refers to a node that does not have any child nodes.

In certain contexts, the terms "parcel," "envelope," "box," "package," "container," "pallet," "carton," "wrapping," and the like are used interchangeably herein to refer to a packaged item or items.

In certain contexts, the terms "wireless tracking system," "hierarchical communications network," "distributed agent operating system," and the like are used interchangeably herein to refer to a system or network of wireless nodes.

Introduction

This specification describes a low-cost, multi-function adhesive tape platform with a form factor that unobtrusively integrates the components useful for implementing a combination of different asset tracking and management functions and also is able to perform a useful ancillary function that otherwise would have to be performed with the attendant need for additional materials, labor, and expense. In an aspect, the adhesive tape platform is implemented as a collection of adhesive products that integrate wireless communications and sensing components within a flexible adhesive structure in a way that not only provides a cost-effective platform for interconnecting, optimizing, and protecting the components of the tracking system but also maintains the flexibility needed to function as an adhesive product that can be deployed seamlessly and unobtrusively into various asset management and tracking applications and workflows, including person and object tracking applications, and asset management workflows such as manufacturing, storage, shipping, delivery, and other logistics associated with moving products and other physical objects, including logistics, sensing, tracking, locationing, warehousing, parking, safety, construction, event detection, road management and infrastructure, security, and healthcare. In some examples, the adhesive tape platforms are used in various aspects of asset management, including sealing assets, transporting assets, tracking assets, monitoring the conditions of assets, inventorying assets, and verifying asset security. In these examples, the assets typically are transported from one location to another by truck, train, ship, or aircraft or within premises, e.g., warehouses by forklift, trolleys etc.

In disclosed examples, an adhesive tape platform includes a plurality of segments that can be separated from the adhesive product (e.g., by cutting, tearing, peeling, or the like) and adhesively attached to a variety of different surfaces to inconspicuously implement any of a wide variety of different wireless communications based network communications and transducing (e.g., sensing, actuating, etc.) applications. Examples of such applications include: event detection applications, monitoring applications, security applications, notification applications, and tracking applications, including inventory tracking, asset tracking, person tracking, animal (e.g., pet) tracking, manufactured parts tracking, and vehicle tracking. In example embodiments, each segment of an adhesive tape platform is equipped with an energy source, wireless communication functionality, transducing functionality, and processing functionality that enable the segment to perform one or more transducing functions and report the results to a remote server or other computer system directly or through a network of tapes. The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and or environment of, for example, an article, object, vehicle, or person, over time.

Systems and processes for fabricating flexible multifunction adhesive tape platforms in efficient and low-cost ways also are described. In addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that can provide local sensing, wireless transmitting, and locationing functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other asset tracking and management applications across heterogeneous environments.

Adhesive Tape Platform

FIG. 1A shows an example asset 10 that is sealed for shipment using an example adhesive tape platform 12 that includes embedded components of a wireless transducing circuit 14 (collectively referred to herein as a "tape node"). In this example, a length 13 of the adhesive tape platform 12 is dispensed from a roll 16 and affixed to the asset 10. The adhesive tape platform 12 includes an adhesive side 18 and a non-adhesive side 20. The adhesive tape platform 12 can be dispensed from the roll 16 in the same way as any conventional packing tape, shipping tape, or duct tape. For example, the adhesive tape platform 12 may be dispensed from the roll 16 by hand, laid across the seam where the two top flaps of the asset 10 meet, and cut to a suitable length either by hand or using a cutting instrument (e.g., scissors or an automated or manual tape dispenser). Examples of such tapes include tapes having non-adhesive sides 20 that carry one or more coatings or layers (e.g., colored, light reflective, light absorbing, and/or light emitting coatings or layers).

Figure 1B:
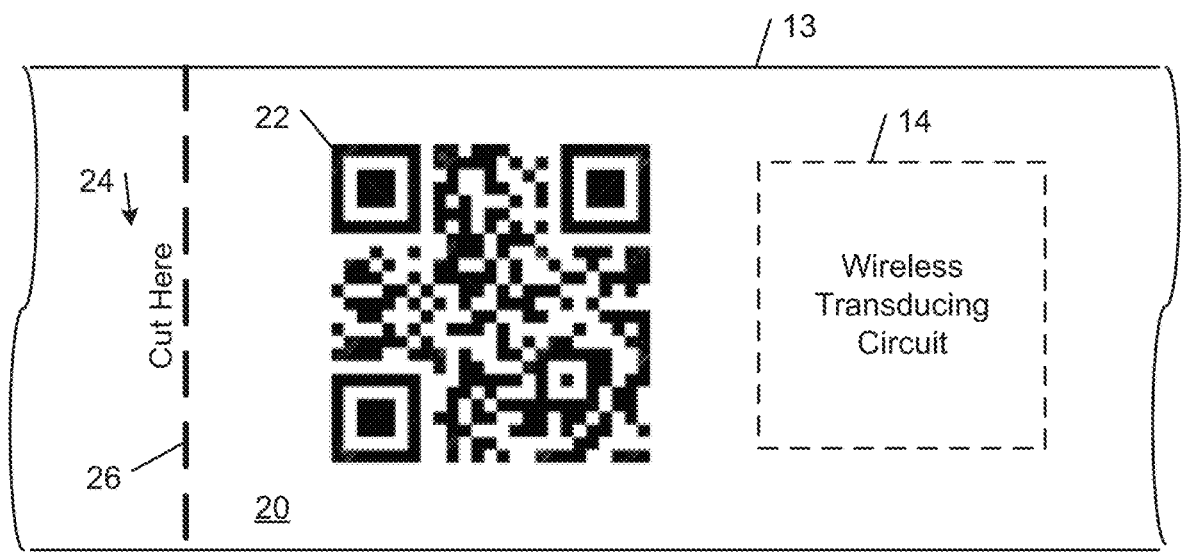
FIG. 1B is a diagrammatic top view of a portion of the segment of the example adhesive tape platform shown in FIG. 1A, according to some embodiments.

Referring to FIG. 1B, in some examples, the non-adhesive side 20 of the length 13 of the adhesive tape platform 12 includes writing or other markings that convey instructions, warnings, or other information to a person or machine (e.g., a bar code reader), or may simply be decorative and/or entertaining. For example, different types of adhesive tape platforms may be marked with distinctive colorations to distinguish one type of adhesive tape platform from another. In the illustrated example, the length 13 of the adhesive tape platform 12 includes a two-dimensional bar code (e.g., a QR Code) 22, written instructions 24 (i.e., "Cut Here"), and an associated cut line 26 that indicates where the user should cut the adhesive tape platform 12. The written instructions 24 and the cut line 26 typically are printed or otherwise marked on the top non-adhesive surface 20 of the adhesive tape platform 12 during manufacture. The two-dimensional bar code 22, on the other hand, may be marked on the non-adhesive surface 20 of the adhesive tape platform 12 during the manufacture of the adhesive product 12 or, alternatively, may be marked on the non-adhesive surface 20 of the adhesive tape platform 12 as needed using, for example, a printer or other marking device.

In order to avoid damage to the functionality of the segments of the adhesive tape platform 12, the cut lines 26 typically demarcate the boundaries between adjacent segments at locations that are free of any active components of the wireless transducing circuit 14. The spacing between the wireless transducing circuit components 14 and the cut lines 26 may vary depending on the intended communication, transducing and/or adhesive taping application. In the example illustrated in FIG. 1A, the length of the adhesive tape platform 12 that is dispensed to seal the asset 10 corresponds to a single segment of the adhesive tape platform 12. In other examples, the length of the adhesive tape platform 12 needed to seal a asset or otherwise serve the adhesive function for which the adhesive tape platform 12 is being applied may include multiple segments 13 of the adhesive tape platform 12, one or more of which segments 13 may be activated upon cutting the length of the adhesive tape platform 12 from the roll 16 and/or applying the length of the adhesive tape platform to the asset 10.

In some examples, the transducing components 14 that are embedded in one or more segments 13 of the adhesive tape platform 12 are activated when the adhesive tape platform 12 is cut along the cut line 26. In these examples, the adhesive tape platform 12 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the transducing components 14 in one or more segments of the adhesive tape platform 12 in response to being separated from the adhesive tape platform 12 (e.g., along the cut line 26).

In some examples, each segment 13 of the adhesive tape platform 12 includes its own respective energy source including energy harvesting elements that can harvest energy from the environment. In some of these examples, each energy source is configured to only supply power to the components in its respective adhesive tape platform segment regardless of the number of contiguous segments 13 that are in a given length of the adhesive tape platform 12. In other examples, when a given length of the adhesive tape platform 12 includes multiple segments 13, the energy sources in the respective segments 13 are configured to supply power to the transducing components 14 in all of the segments 13 in the given length of the adhesive tape platform 12. In some of these examples, the energy sources are connected in parallel and concurrently activated to power the transducing components 14 in all of the segments 13 at the same time. In other examples, the energy sources are connected in parallel and alternately activated to power the transducing components 14 in respective ones of the adhesive tape platform segments 13 at different time periods, which may or may not overlap.

Figure 2:
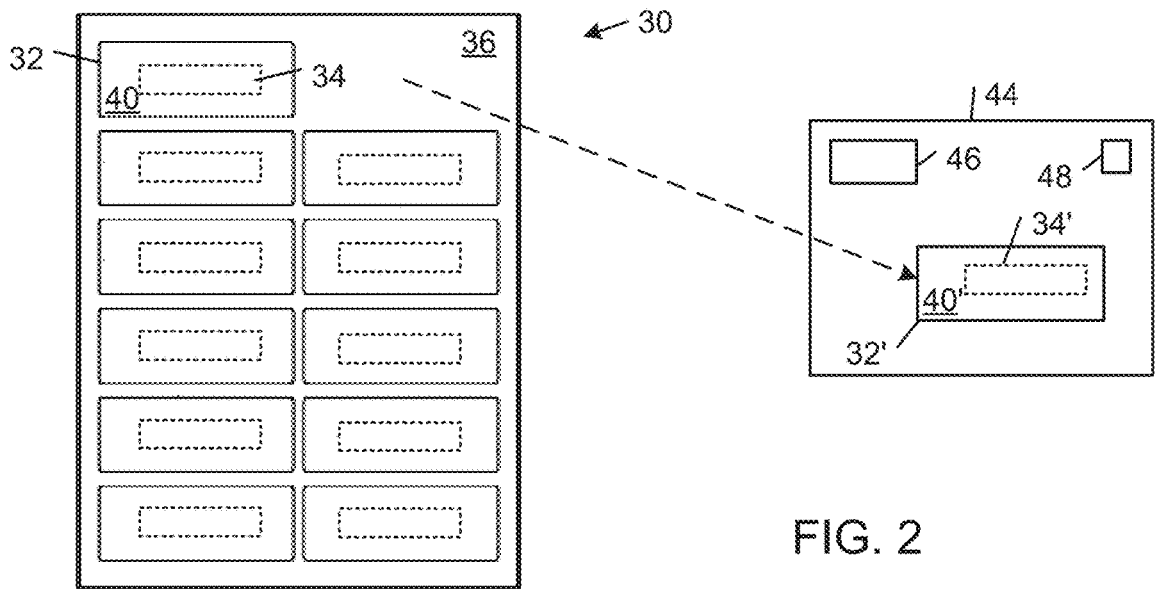
FIG. 2 is a diagrammatic view of an example of an envelope carrying a segment of an example adhesive tape platform dispensed from a backing sheet, according to some embodiments.

FIG. 2 shows an example adhesive tape platform 30 that includes a set of adhesive tape platform segments 32 each of which includes a respective set of embedded wireless transducing circuit components 34, and a backing sheet 36 with a release coating that prevents the adhesive segments 32 from adhering strongly to the backing sheet 36. Each adhesive tape platform segment 32 includes an adhesive side facing the backing sheet 36, and an opposing non-adhesive side 40. In this example, a particular segment 32' of the adhesive tape platform 30 has been removed from the backing sheet 36 and affixed to an envelope 44. Each segment 32 of the adhesive tape platform 30 can be removed from the backing sheet 36 in the same way that adhesive labels can be removed from a conventional sheet of adhesive labels (e.g., by manually peeling a segment 32 from the backing sheet 36). In general, the non-adhesive side 40' of the segment 32' may include any type of writing, markings, decorative designs, or other ornamentation. In the illustrated example, the non-adhesive side 40' of the segment 32' includes writing or other markings that correspond to a destination address for the envelope 44. The envelope 44 also includes a return address 46 and, optionally, a postage stamp or mark 48.

In some examples, segments of the adhesive tape platform 12 are deployed by a human operator. The human operator may be equipped with a mobile phone or other device that allows the operator to authenticate and initialize the adhesive tape platform 12. In addition, the operator can take a picture of a asset including the adhesive tape platform and any barcodes associated with the asset and, thereby, create a persistent record that links the adhesive tape platform 12 to the asset. In addition, the human operator typically will send the picture to a network service and/or transmit the picture to the adhesive tape platform 12 for storage in a memory component of the adhesive tape platform 12.

In some examples, the wireless transducing circuit components 34 that are embedded in a segment 32 of the adhesive tape platform 12 are activated when the segment 32 is removed from the backing sheet 32. In some of these examples, each segment 32 includes an embedded capacitive sensing system that can sense a change in capacitance when the segment 32 is removed from the backing sheet 36. As explained in detail below, a segment 32 of the adhesive tape platform 30 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 34 in the segment 32 in response to the detection of a change in capacitance between the segment 32 and the backing sheet 36 as a result of removing the segment 32 from the backing sheet 36.

Figure 3:
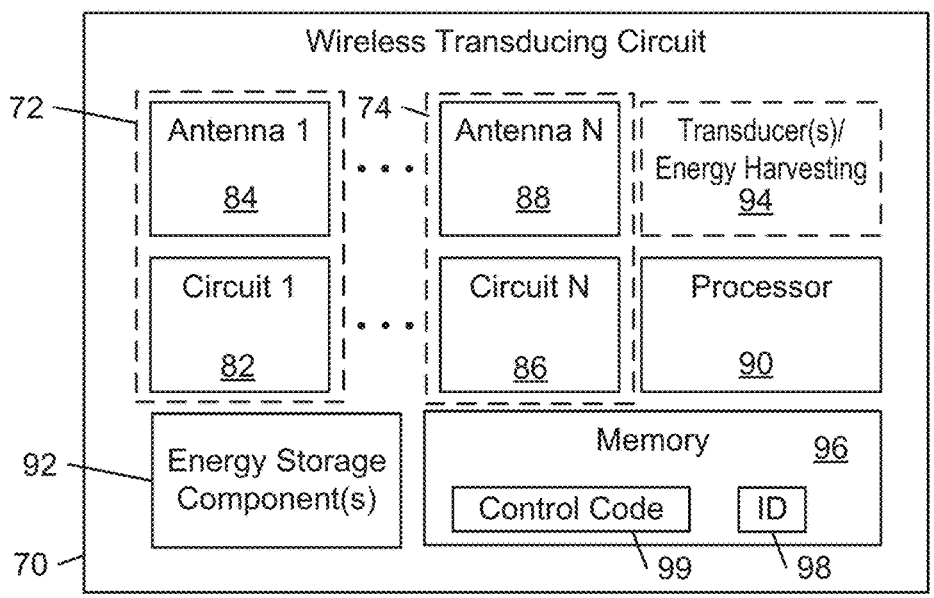
FIG. 3 is a schematic view of an example segment of an adhesive tape platform, according to some embodiments.

FIG. 3 shows a block diagram of the components of an example wireless transducing circuit 70 that includes a number of communication systems 72, 74. Example communication systems 72, 74 include a GPS system that includes a GPS receiver circuit 82 (e.g., a receiver integrated circuit) and a GPS antenna 84, and one or more wireless communication systems each of which includes a respective transceiver circuit 86 (e.g., a transceiver integrated circuit) and a respective antenna 88. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. The wireless transducing circuit 70 also includes a processor 90 (e.g., a microcontroller or microprocessor), one or more energy storage devices 92 (e.g., non-rechargeable or rechargeable printed flexible battery, conventional single or multiple cell battery, and/or a super capacitor or charge pump), one or more transducers 94 (e.g., sensors and/or actuators, and, optionally, one or more energy harvesting transducer components). In some examples, the conventional single or multiple cell battery may be a watch style disk or button cell battery that is associated electrical connection apparatus (e.g., a metal clip) that electrically connects the electrodes of the battery to contact pads on the flexible circuit 116.

Examples of sensing transducers 94 include a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, and a humidity sensor. Examples of actuating (e.g., energy emitting) transducers 94 include light emitting components (e.g., light emitting diodes and displays), electro-acoustic transducers (e.g., audio speakers), electric motors, and thermal radiators (e.g., an electrical resistor or a thermoelectric cooler).

In some examples, the wireless transducing circuit 70 includes a memory 96 for storing data, including, e.g., profile data, state data, event data, sensor data, localization data, security data, and one or more unique identifiers (ID) 98 associated with the wireless transducing circuit 70, such as a product ID, a type ID, and a media access control (MAC) ID, and control code 99. In some examples, the memory 96 may be incorporated into one or more of the processor 90 or transducers 94, or may be a separate component that is integrated in the wireless transducing circuit 70 as shown in FIG. 3. The control code typically is implemented as programmatic functions or program modules that control the operation of the wireless transducing circuit 70, including a tape node communication manager that manages the manner and timing of tape node communications, a tape node power manager that manages power consumption, and a tape node connection manager that controls whether connections with other tape nodes are secure connections or unsecure connections, and a tape node storage manager that securely manages the local data storage on the node. The tape node connection manager ensures the level of security required by the end application and supports various encryption mechanisms. The tape node power manager and tape communication manager work together to optimize the battery consumption for data communication. In some examples, execution of the control code by the different types of tape nodes described herein may result in the performance of similar or different functions.

Figure 4:
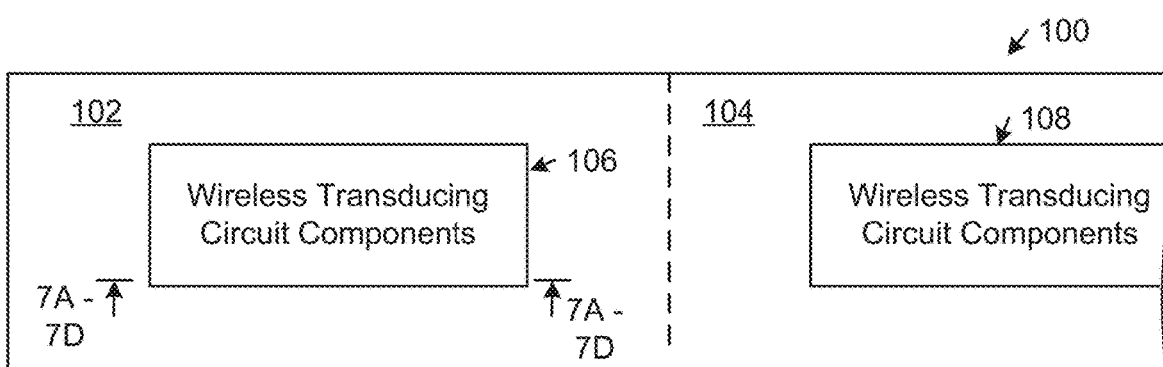
FIG. 4 is a diagrammatic top view of a length of an example adhesive tape platform, according to some embodiments.

FIG. 4 is a top view of a portion of an example flexible adhesive tape platform 100 that shows a first segment 102 and a portion of a second segment 104. Each segment 102, 104 of the flexible adhesive tape platform 100 includes a respective set 106, 108 of the components of the wireless transducing circuit 70. The segments 102, 104 and their respective sets of components 106, 108 typically are identical and configured in the same way. In some other embodiments, however, the segments 102, 104 and/or their respective sets of components 106, 108 are different and/or configured in different ways. For example, in some examples, different sets of the segments of the flexible adhesive tape platform 100 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

An example method of fabricating the adhesive tape platform 100 (see FIG. 4) according to a roll-to-roll fabrication process is described in connection with FIGS. 6, 7A, and 7B of U.S. Pat. No. 10,262,255, issued Apr. 16, 2019, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

Figure 5A:
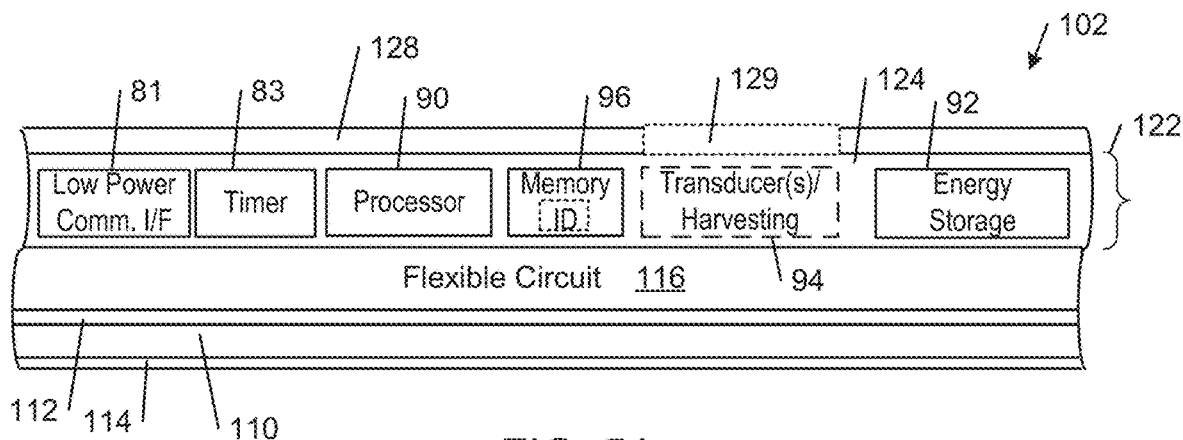
FIGS. 5A-5C show diagrammatic cross-sectional side views of portions of different respective adhesive tape platforms, according to some embodiments.

FIG. 5A shows a cross-sectional side view of a portion of an example segment 102 of the flexible adhesive tape platform 100 that includes a respective set of the components of the wireless transducing circuit 106 corresponding to the first tape node type (i.e., white). The flexible adhesive tape platform segment 102 includes an adhesive layer 112, an optional flexible substrate 110, and an optional adhesive layer 114 on the bottom surface of the flexible substrate 110. If the bottom adhesive layer 114 is present, a release liner (not shown) may be (weakly) adhered to the bottom surface of the adhesive layer 114. In some examples, the adhesive layer 114 includes an adhesive (e.g., an acrylic foam adhesive) that has a high bond strength that is sufficient to prevent removal of the adhesive segment 102 from a surface on which the adhesive layer 114 is adhered without destroying the physical or mechanical integrity of the adhesive segment 102 and/or one or more of its constituent components. In some examples, the optional flexible substrate 110 is implemented as a prefabricated adhesive tape that includes the adhesive layers 112, 114 and the optional release liner. In other examples, the adhesive layers 112, 114 are applied to the top and bottom surfaces of the flexible substrate 110 during the fabrication of the adhesive tape platform 100. The adhesive layer 112 bonds the flexible substrate 110 to a bottom surface of a flexible circuit 116, that includes one or more wiring layers (not shown) that connect the processor 90, a low power wireless communication interface 81 (e.g., a Zigbee, Bluetooth® Low Energy (BLE) interface, or other low power communication interface), a timer circuit 83, transducing and/or energy harvesting component(s) 94 (if present), the memory 96, and other components in a device layer 122 to each other and to the energy storage component 92 and, thereby, enable the transducing, tracking and other functionalities of the flexible adhesive tape platform segment 102. The low power wireless communication interface 81 typically includes one or more of the antennas 84, 88 and one or more of the wireless circuits 82, 86.

Figure 5B:
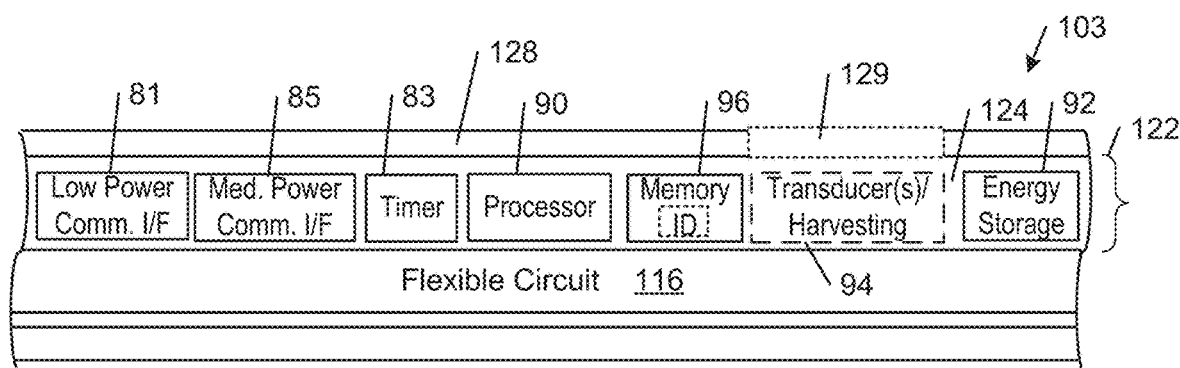

FIG. 5B shows a cross-sectional side view of a portion of an example segment 103 of the flexible adhesive tape platform 100 that includes a respective set of the components of the wireless transducing circuit 106 corresponding to the second tape node type (i.e., green). In this example, the flexible adhesive tape platform segment 103 differs from the segment 102 shown in FIG. 5A by the inclusion of a medium power communication interface 85 (e.g., a LoRa interface) in addition to the low power communications interface that is present in the first tape node type (i.e., white). The medium power communication interface has longer communication range than the low power communication interface. In some examples, one or more other components of the flexible adhesive tape platform segment 103 differ, for example, in functionality or capacity (e.g., larger energy source).

Figure 5C:
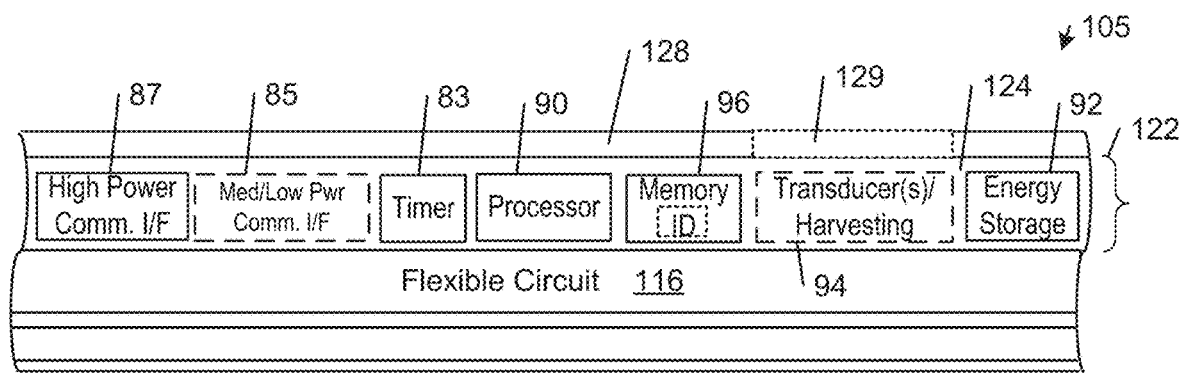

FIG. 5C shows a cross-sectional side view of a portion of an example segment 105 of the flexible adhesive tape platform 100 that includes a respective set of the components of the wireless transducing circuit 106 corresponding to the third tape node type (i.e., black). In this example, the flexible adhesive tape platform segment 105 includes a high power communications interface 87 (e.g., a cellular interface; e.g., GSM/GPRS) and an optional medium and/or low power communications interface 85. The high power communication range provides global coverage to available infrastructure (e.g. the cellular network). In some examples, one or more other components of the flexible adhesive tape platform segment 105 differ, for example, in functionality or capacity (e.g., larger energy source).

FIGS. 5A-5C show examples in which the cover layer 128 of the flexible adhesive tape platform 100 includes one or more interfacial regions 129 positioned over one or more of the transducers 94. In examples, one or more of the interfacial regions 129 have features, properties, compositions, dimensions, and/or characteristics that are designed to improve the operating performance of the platform 100 for specific applications. In some examples, the flexible adhesive tape platform 100 includes multiple interfacial regions 129 over respective transducers 94, which may be the same or different depending on the target applications. Example interfacial regions include an opening, an optically transparent window, and/or a membrane located in the interfacial region 129 of the cover 128 that is positioned over the one or more transducers and/or energy harvesting components 94. Additional details regarding the structure and operation of example interfacial regions 129 are described in U.S. Provisional Patent Application No. 62/680,716, filed Jun. 5, 2018, PCT Patent Application No. PCT/US2018/064919, filed Dec. 11, 2018, U.S. Pat. No. 10,885,420, issued Jan. 4, 2021, U.S. Pat. No. 10,902,310 issued Jan. 25, 2021, and U.S. Provisional Patent Application No. 62/670,712, filed May 11, 2018, all of which are incorporated herein in their entirety.

In some examples, a flexible polymer layer 124 encapsulates the device layer 122 and thereby reduces the risk of damage that may result from the intrusion of contaminants and/or liquids (e.g., water) into the device layer 122. The flexible polymer layer 124 also planarizes the device layer 122. This facilitates optional stacking of additional layers on the device layer 122 and also distributes forces generated in, on, or across the adhesive tape platform segment 102 so as to reduce potentially damaging asymmetric stresses that might be caused by the application of bending, torqueing, pressing, or other forces that may be applied to the flexible adhesive tape platform segment 102 during use. In the illustrated example, a flexible cover 128 is bonded to the planarizing polymer 124 by an adhesive layer (not shown).

The flexible cover 128 and the flexible substrate 110 may have the same or different compositions depending on the intended application. In some examples, one or both of the flexible cover 128 and the flexible substrate 110 include flexible film layers and/or paper substrates, where the film layers may have reflective surfaces or reflective surface coatings. Example compositions for the flexible film layers include polymer films, such as polyester, polyimide, polyethylene terephthalate (PET), and other plastics. The optional adhesive layer on the bottom surface of the flexible cover 128 and the adhesive layers 112, 114 on the top and bottom surfaces of the flexible substrate 110 typically include a pressure-sensitive adhesive (e.g., a silicon-based adhesive). In some examples, the adhesive layers are applied to the flexible cover 128 and the flexible substrate 110 during manufacture of the adhesive tape platform 100 (e.g., during a roll-to-roll or sheet-to-sheet fabrication process). In other examples, the flexible cover 128 may be implemented by a prefabricated single-sided pressure-sensitive adhesive tape and the flexible substrate 110 may be implemented by a prefabricated double-sided pressure-sensitive adhesive tape; both kinds of tape may be readily incorporated into a roll-to-roll or sheet-to-sheet fabrication process. In some examples, the flexible polymer layer 124 is composed of a flexible epoxy (e.g., silicone).

In some examples, the energy storage device 92 is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low power wireless communication interface 81 and/or the processor(s) 90 may be integrated on the flexible battery substrate. In some examples, one or more of such components also (e.g., the flexible antennas and the flexible interconnect circuits) may be printed on the flexible battery substrate.

In some examples, the flexible circuit 116 is formed on a flexible substrate by printing, etching, or laminating circuit patterns on the flexible substrate. In some examples, the flexible circuit 116 is implemented by one or more of a single-sided flex circuit, a double access or back bared flex circuit, a sculpted flex circuit, a double-sided flex circuit, a multi-layer flex circuit, a rigid flex circuit, and a polymer thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example flexible adhesive tape platform segments 102 shown in FIGS. 5A-5C, the flexible circuit 116 is a single access flex circuit that interconnects the components of the adhesive tape platform on a single side of the flexible circuit 116. In other examples, the flexible circuit 116 is a double access flex circuit that includes a front-side conductive pattern that interconnects the low power communications interface 81, the timer circuit 83, the processor 90, the one or more transducers 94 (if present), and the memory 96, and allows through-hole access (not shown) to a back-side conductive pattern that is connected to the flexible battery (not shown). In these examples, the front-side conductive pattern of the flexible circuit 116 connects the communications circuits 82, 86 (e.g., receivers, transmitters, and transceivers) to their respective antennas 84, 88 and to the processor 90, and also connects the processor 90 to the one or more sensors 94 and the memory 96. The backside conductive pattern connects the active electronics (e.g., the processor 90, the communications circuits 82, 86, and the transducers) on the front-side of the flexible circuit 116 to the electrodes of the flexible battery 116 via one or more through holes in the substrate of the flexible circuit 116.

Depending on the target application, the wireless transducing circuits 70 are distributed across the flexible adhesive tape platform 100 according to a specified sampling density, which is the number of wireless transducing circuits 70 for a given unit size (e.g., length or area) of the flexible adhesive tape platform 100. In some examples, a set of multiple flexible adhesive tape platforms 100 are provided that include different respective sampling densities in order to seal different asset sizes with a desired number of wireless transducing circuits 70. In particular, the number of wireless transducing circuits per asset size is given by the product of the sampling density specified for the adhesive tape platform and the respective size of the adhesive tape platform 100 needed to seal the asset. This allows an automated packaging system to select the appropriate type of flexible adhesive tape platform 100 to use for sealing a given asset with the desired redundancy (if any) in the number of wireless transducer circuits 70. In some example applications (e.g., shipping low value goods), only one wireless transducing circuit 70 is used per asset, whereas in other applications (e.g., shipping high value goods) multiple wireless transducing circuits 70 are used per asset. Thus, a flexible adhesive tape platform 100 with a lower sampling density of wireless transducing circuits 70 can be used for the former application, and a flexible adhesive tape platform 100 with a higher sampling density of wireless transducing circuits 70 can be used for the latter application. In some examples, the flexible adhesive tape platforms 100 are color-coded or otherwise marked to indicate the respective sampling densities with which the wireless transducing circuits 70 are distributed across the different types of adhesive tape platforms 100.

Figure 6A:
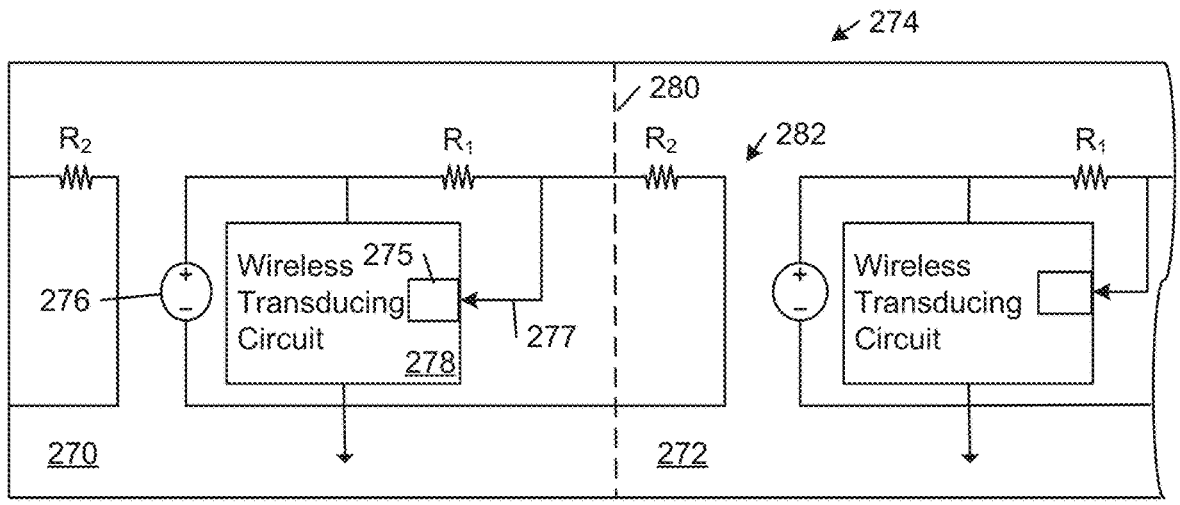
FIGS. 6A-6B are diagrammatic top views of a length of an example adhesive tape platform, according to some embodiments.

Referring to FIG. 6A, in some examples, each of one or more of the segments 270, 272 of a flexible adhesive tape platform 274 includes a respective one-time wake circuit 275 that delivers power from the respective energy source 276 to the respective wireless circuit 278 (e.g., a processor, one or more transducers, and one or more wireless communications circuits) in response to an event. In some of these examples, the wake circuit 275 is configured to transition from an off state to an on state when the voltage on the wake node 277 exceeds a threshold level, at which point the wake circuit transitions to an on state to power-on the segment 270. In the illustrated example, this occurs when the user separates the segment from the adhesive tape platform 274, for example, by cutting across the adhesive tape platform 274 at a designated location (e.g., along a designated cut-line 280). In particular, in its initial, un-cut state, a minimal amount of current flows through the resistors R1 and R2. As a result, the voltage on the wake node 277 remains below the threshold turn-on level. After the user cuts across the adhesive tape platform 274 along the designated cut-line 280, the user creates an open circuit in the loop 282, which pulls the voltage of the wake node above the threshold level and turns on the wake circuit 275. As a result, the voltage across the energy source 276 will appear across the wireless circuit 278 and, thereby, turn on the segment 270. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of an adhesive tape platform includes a respective sensor and a respective wake circuit that delivers power from the respective energy source to the respective one or more of the respective wireless circuit components 278 in response to an output of the sensor. In some examples, the respective sensor is a strain sensor that produces a wake signal based on a change in strain in the respective segment. In some of these examples, the strain sensor is affixed to a adhesive tape platform and configured to detect the stretching of the tracking adhesive tape platform segment as the segment is being peeled off a roll or a sheet of the adhesive tape platform. In some examples, the respective sensor is a capacitive sensor that produces a wake signal based on a change in capacitance in the respective segment. In some of these examples, the capacitive sensor is affixed to an adhesive tape platform and configured to detect the separation of the tracking adhesive tape platform segment from a roll or a sheet of the adhesive tape platform. In some examples, the respective sensor is a flex sensor that produces a wake signal based on a change in curvature in the respective segment. In some of these examples, the flex sensor is affixed to a adhesive tape platform and configured to detect bending of the tracking adhesive tape platform segment as the segment is being peeled off a roll or a sheet of the adhesive tape platform. In some examples, the respective sensor is a near field communications sensor that produces a wake signal based on a change in inductance in the respective segment.

Figure 6B:
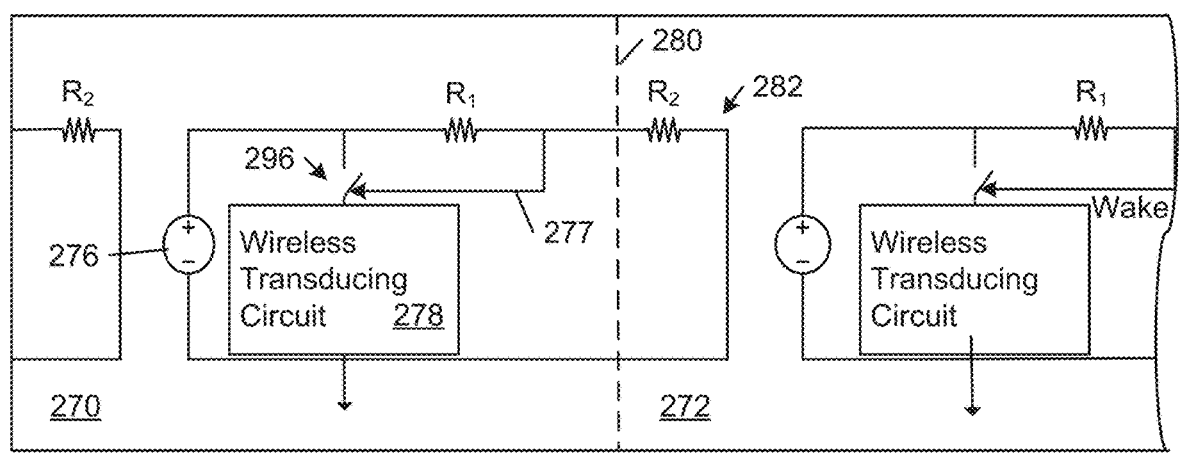

FIG. 6B shows another example of an adhesive tape platform 294 that delivers power from the respective energy source 276 to the respective tracking circuit 278 (e.g., a processor, one or more transducers, and one or more wireless communications circuits) in response to an event. This example is similar in structure and operation as the adhesive tape platform 294 shown in FIG. 6A, except that the wake circuit 275 is implemented by a switch 296 that is configured to transition from an open state to a closed state when the voltage on the switch node 277 exceeds a threshold level. In the initial state of the adhesive tape platform 294, the voltage on the switch node is below the threshold level as a result of the low current level flowing through the resistors R1 and R2. After the user cuts across the adhesive tape platform 294 along the designated cut-line 280, the user creates an open circuit in the loop 282, which pulls up the voltage on the switch node above the threshold level to close the switch 296 and turn on the wireless circuit 278.

Figure 6C:
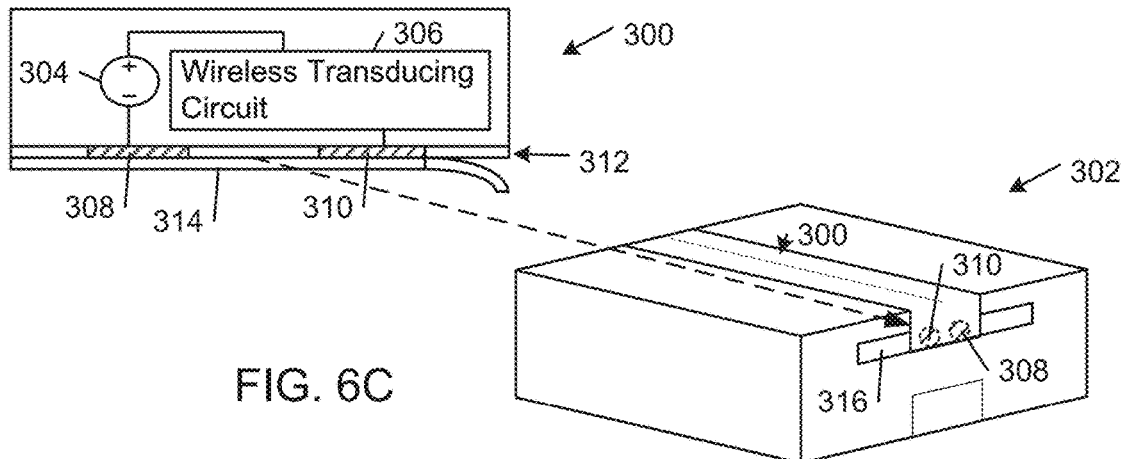
FIG. 6C is a diagrammatic view of a length of an example adhesive tape platform adhered to an asset, according to some embodiments.

FIG. 6C shows a diagrammatic cross-sectional front view of an example adhesive tape platform 300 and a perspective view of an example asset 302. Instead of activating the adhesive tape platform in response to separating a segment of the adhesive tape platform from a roll or a sheet of the adhesive tape platform, this example is configured to supply power from the energy source 302 to turn on the wireless transducing circuit 306 in response to establishing an electrical connection between two power terminals 308, 310 that are integrated into the adhesive tape platform. In particular, each segment of the adhesive tape platform 300 includes a respective set of embedded tracking components, an adhesive layer 312, and an optional backing sheet 314 with a release coating that prevents the segments from adhering strongly to the backing sheet 314. In some examples, the power terminals 308, 310 are composed of an electrically conductive material (e.g., a metal, such as copper) that may be printed or otherwise patterned and/or deposited on the backside of the adhesive tape platform 300. In operation, the adhesive tape platform can be activated by removing the backing sheet 314 and applying the exposed adhesive layer 312 to a surface that includes an electrically conductive region 316. In the illustrated embodiment, the electrically conductive region 316 is disposed on a portion of the asset 302. When the adhesive backside of the adhesive tape platform 300 is adhered to the asset with the exposed terminals 308, 310 aligned and in contact with the electrically conductive region 316 on the asset 302, an electrical connection is created through the electrically conductive region 316 between the exposed terminals 308, 310 that completes the circuit and turns on the wireless transducing circuit 306. In particular embodiments, the power terminals 308, 310 are electrically connected to any respective nodes of the wireless transducing circuit 306 that would result in the activation of the tracking circuit 306 in response to the creation of an electrical connection between the power terminals 308, 310.

In some examples, after a tape node is turned on, it will communicate with the network service to confirm that the user/operator who is associated with the tape node is an authorized user who has authenticated himself or herself to the network service 54. In these examples, if the tape node cannot confirm that the user/operator is an authorized user, the tape node will turn itself off.

Deployment of Tape Nodes

Figure 7:
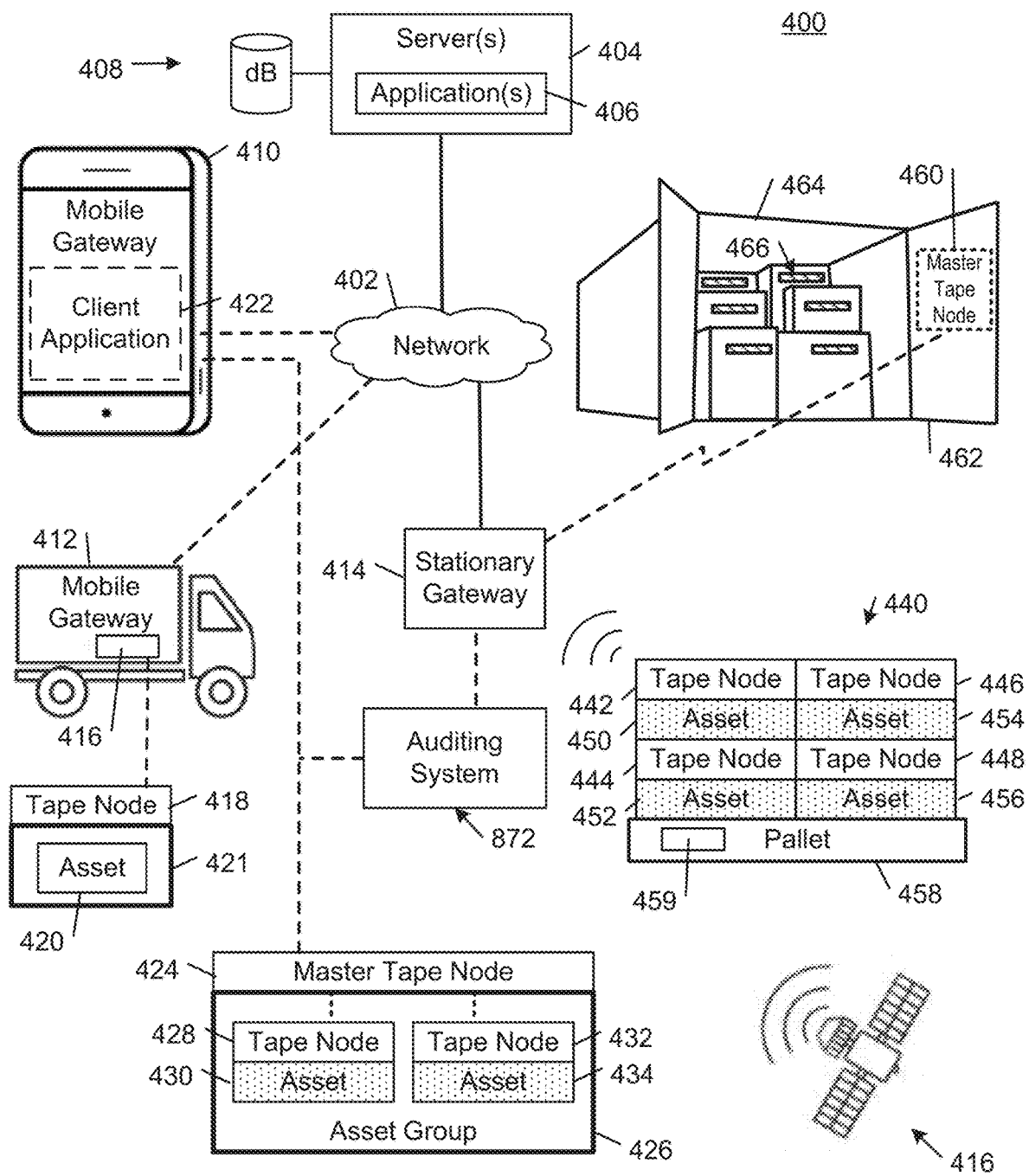
FIG. 7 is a diagrammatic view of an example of a network environment supporting communications with segments of an adhesive tape platform, according to some embodiments.

FIG. 7 shows an example network communications environment 400 (also referred to herein as an "IOT system" 400 or "tracking system" 400) that includes a network 402 that supports communications between one or more servers 404 executing one or more applications of a network service 408, mobile gateways 410, 412, a stationary gateway 414, and various types of tape nodes that are associated with various assets (e.g., parcels, equipment, tools, persons, and other things). Each member of the IOT system 400 may be referred to as a node of the IOT system 400, including the tape nodes, other wireless IOT devices, gateways (stationary and mobile), client devices, and servers. In some examples, the network 402 includes one or more network communication systems and technologies, including any one or more of wide area networks, local area networks, public networks (e.g., the internet), private networks (e.g., intranets and extranets), wired networks, and wireless networks. For example, the network 402 includes communications infrastructure equipment, such as a geolocation satellite system 416 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications 406 leverage the above-mentioned communications technologies to create a hierarchical wireless network of tape nodes that improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link the communication uses the infrastructure security mechanisms. In case of communications among tapes nodes, the communication is secured through a custom security mechanism. In certain cases, tape nodes can also be configured to support block chain to protect the transmitted and stored data.

A set of tape nodes can be configured by the network service 408 to create hierarchical communications network. The hierarchy can be defined in terms of one or more factors, including functionality (e.g., wireless transmission range or power), role (e.g., master tape node vs. peripheral tape node), or cost (e.g., a tape node equipped with a cellular transceiver vs. a peripheral tape node equipped with a Bluetooth LE transceiver). Tape nodes can be assigned to different levels of a hierarchical network according to one or more of the above-mentioned factors. For example, the hierarchy can be defined in terms of communication range or power, where tape nodes with higher power or longer communication range transceivers are arranged at a higher level of the hierarchy than tape nodes with lower power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure can be formulated as an optimization problem with battery capacity of nodes, power consumption in various modes of operation, desired latency, external environment, etc. and can be solved using modern optimization methods e.g. neural networks, artificial intelligence, and other machine learning computing systems that take expected and historical data to create an optimal solution and can create algorithms for modifying the system's behavior adaptively in the field.

The tape nodes may be deployed by automated equipment or manually. In this process, a tape node typically is separated from a roll or sheet and adhered to a asset, or other stationary or mobile object (e.g., a structural element of a warehouse, or a vehicle, such as a delivery truck) or stationary object (e.g., a structural element of a building). This process activates the tape node and causes the tape node to communicate with a server 404 of the network service 408. In this process, the tape node may communicate through one or more other tape nodes in the communication hierarchy. In this process, the network server 404 executes the network service application 406 to programmatically configure tape nodes that are deployed in the environment 400. In some examples, there are multiple classes or types of tape nodes, where each tape node class has a different respective set of functionalities and/or capacities.

In some examples, the one or more network service servers 404 communicate over the network 402 with one or more gateways that are configured to send, transmit, forward, or relay messages to the network 402 and activated tape nodes that are associated with respective assets and within communication range. Example gateways include mobile gateways 410, 412 and a stationary gateway 414. In some examples, the mobile gateways 410, 412, and the stationary gateway 414 are able to communicate with the network 402 and with designated sets or groups of tape nodes.

In some examples, the mobile gateway 412 is a vehicle (e.g., a delivery truck or other mobile hub) that includes a wireless communications unit 416 that is configured by the network service 408 to communicate with a designated set of tape nodes, including a peripheral tape node 418 in the form of a label that is adhered to an asset 420 contained within a parcel 421 (e.g., an envelope), and is further configured to communicate with the network service 408 over the network 402. In some examples, the peripheral tape node 418 includes a lower power wireless communications interface of the type used in, e.g., tape node 102 (shown in FIG. 5A), and the wireless communications unit 416 is implemented by a tape node (e.g., one of tape node 103 or tape node 105, respectively shown in FIGS. 5B and 5C) that includes a lower power communications interface for communicating with tape nodes within range of the mobile gateway 412 and a higher power communications interface for communicating with the network 402. In this way, the tape nodes 418 and 416 create a hierarchical wireless network of nodes for transmitting, forwarding, bridging, relaying, or otherwise communicating wireless messages to, between, or on behalf of the peripheral tape node 418 and the network service 408 in a power-efficient and cost-effective way.

In some examples, the mobile gateway 410 is a mobile phone that is operated by a human operator and executes a client application 422 that is configured by the network service 408 to communicate with a designated set of tape nodes, including a master tape node 424 that is adhered to a parcel 426 (e.g., a box), and is further configured to communicate with the network service 408 over the network 402. In the illustrated example, the parcel 426 contains a first parcel labeled or sealed by a tape node 428 and containing a first asset 430, and a second parcel labeled or sealed by a tape node 432 and containing a second asset 434. As explained in detail below, the master tape node 424 communicates with each of the peripheral tape nodes 428, 432 and communicates with the mobile gateway 408 in accordance with a hierarchical wireless network of tape nodes. In some examples, each of the peripheral tape nodes 428, 432 includes a lower power wireless communications interface of the type used in, e.g., tape node 102 (shown in FIG. 5A), and the master tape node 424 is implemented by a tape node (e.g., tape node 103, shown in FIG. 5B) that includes a lower power communications interface for communicating with the peripheral tape nodes 428, 432 contained within the parcel 426, and a higher power communications interface for communicating with the mobile gateway 410. The master tape node 424 is operable to relay wireless communications between the tape nodes 428, 432 contained within the parcel 426 and the mobile gateway 410, and the mobile gateway 410 is operable to relay wireless communications between the master tape node 424 and the network service 408 over the wireless network 402. In this way, the master tape node 424 and the peripheral tape nodes 428 and 432 create a hierarchical wireless network of nodes for transmitting, forwarding, relaying, or otherwise communicating wireless messages to, between, or on behalf of the peripheral tape nodes 428, 432 and the network service 408 in a power-efficient and cost-effective way.

In some examples, the stationary gateway 414 is implemented by a server executing a server application that is configured by the network service 408 to communicate with a designated set 440 of tape nodes 442, 444, 446, 448 that are adhered to respective parcels containing respective assets 450, 452, 454, 456 on a pallet 458. In other examples, the stationary gateway 414 is implemented by a tape node (e.g., one of tape node 103 or tape node 105, respectively shown in FIGS. 5B and 5C) that is adhered to, for example, a wall, column or other infrastructure component of the environment 400, and includes a lower power communications interface for communicating with tape nodes within range of the stationary gateway 414 and a higher power communications interface for communicating with the network 402. In one embodiment, each of the tape nodes 442-448 is a peripheral tape node and is configured by the network service 408 to communicate individually with the stationary gateway 414, which relays communications from the tape nodes 442-448 to the network service 408 through the stationary gateway 414 and over the communications network 402. In another embodiment, one of the tape nodes 442-448 at a time is configured as a master tape node that transmits, forwards, relays, or otherwise communicate wireless messages to, between, or on behalf of the other tape nodes on the pallet 458. In this embodiment, the master tape node may be determined by the tape nodes 442-448 or designated by the network service 408. In some examples, the tape node with the longest range or highest remaining power level is determined to be the master tape node. In some examples, when the power level of the current master tape node drops below a certain level (e.g., a fixed power threshold level or a threshold level relative to the power levels of one or more of the other tape nodes), another one of the tape nodes assumes the role of the master tape node. In some examples, a master tape node 459 is adhered to the pallet 458 and is configured to perform the role of a master node for the tape nodes 442-448. In these ways, the tape nodes 442-448, 458 are configurable to create different hierarchical wireless networks of nodes for transmitting, forwarding, relaying, bridging, or otherwise communicating wireless messages with the network service 408 through the stationary gateway 414 and over the network 402 in a power-efficient and cost-effective way.

In embodiments, the wireless networking system 400 further includes an auditing system 872. Auditing system 872 is shown as a stand-alone device, but it should be appreciated that it may be incorporated as a component of one or more of any of the tape nodes, gateways, server, or other devices of the wireless tracking system 400. Auditing system 872 is communicatively coupled to the stationary gateway 804, mobile gateway 810, the server 804, etc. The monitoring module 872 may be located within a facility (e.g., a distribution center, manufacturing facility, shipping facility, etc.) and receive, organize, monitor, and/or dispense tape nodes based on an agent's (e.g., tape node) assigned task. The auditing system 872 may be operated or receive instructions, from the client device, mobile gateway 810, 812, and/or stationary gateway 814 for identifying a subset of a plurality of tape nodes. The auditing system 872 may initiate audits of tape nodes, perform audits of tape nodes, and retrieve audit test result data from tape nodes. The auditing system 872 may update and maintain an auditing database of the database 408. The auditing system 872 may further identify tape nodes that have failed audits and require replacement, refurbishment, or recharging. In embodiments, the monitoring module 872 may scan an identifier of a tape node and relay information regarding the tape node to the server 404 or the database 408, via the stationary gateway 814 or via another wireless node.

In the illustrated example, the stationary gateway 414 also is configured by the network service 408 to communicate with a designated set of tape nodes, including a master tape node 460 that is adhered to the inside of a door 462 of a shipping container 464, and is further configured to communicate with the network service 408 over the network 402. In the illustrated example, the shipping container 464 contains a number of parcels labeled or sealed by respective peripheral tape nodes 466 and containing respective assets. The master tape node 416 communicates with each of the peripheral tape nodes 466 and communicates with the stationary gateway 415 in accordance with a hierarchical wireless network of tape nodes. In some examples, each of the peripheral tape nodes 466 includes a lower power wireless communications interface of the type used in, e.g., tape node 102 (shown in FIG. 5A), and the master tape node 460 is implemented by a tape node (e.g., tape node 103, shown in FIG. 5B) that includes a lower power communications interface for communicating with the peripheral tape nodes 466 contained within the shipping container 464, and a higher power communications interface for communicating with the stationary gateway 414.

In some examples, when the doors of the shipping container 464 are closed, the master tape node 460 is operable to communicate wirelessly with the peripheral tape nodes 466 contained within the shipping container 464. In an example, the master tape node 460 is configured to collect sensor data from the peripheral tape nodes and, in some embodiments, process the collected data to generate, for example, one or more histograms from the collected data. When the doors of the shipping container 464 are open, the master tape node 460 is programmed to detect the door opening (e.g., with an accelerometer component of the master tape node 460) and, in addition to reporting the door opening event to the network service 408, the master tape node 460 is further programmed to transmit the collected data and/or the processed data in one or more wireless messages to the stationary gateway 414. The stationary gateway 414, in turn, is operable to transmit the wireless messages received from the master tape node 460 to the network service 408 over the wireless network 402. Alternatively, in some examples, the stationary gateway 414 also is operable to perform operations on the data received from the master tape node 460 with the same type of data produced by the master node 459 based on sensor data collected from the tape nodes 442-448. In this way, the master tape node 460 and the peripheral tape nodes 466 create a hierarchical wireless network of nodes for transmitting, forwarding, relaying, or otherwise communicating wireless messages to, between, or on behalf of the peripheral tape nodes 466 and the network service 408 in a power-efficient and cost-effective way.

In an example of the embodiment shown in FIG. 7, there are three classes of tape nodes: a short range tape node, a medium range tape node, and a long range tape node, as respectively shown in FIGS. 5A-5C. The short range tape nodes typically are adhered directly to parcels containing assets. In the illustrated example, the tape nodes 418, 428, 432, 442-448, 466 are short range tape nodes. The short range tape nodes typically communicate with a low power wireless communication protocol (e.g., Bluetooth LE, Zigbee, or Z-wave). The medium range tape nodes typically are adhered to objects (e.g., a box 426 and a shipping container 460) that are associated with multiple parcels that are separated from the medium range tape nodes by a barrier or a large distance. In the illustrated example, the tape nodes 424 and 460 are medium range tape nodes. The medium range tape nodes typically communicate with a medium power wireless communication protocol (e.g., LoRa or Wi-Fi). The long-range tape nodes typically are adhered to mobile or stationary infrastructure of the wireless communication environment 400. In the illustrated example, the mobile gateway tape node 412 and the stationary gateway tape node 414 are long range tape nodes. The long range tape nodes typically communicate with other nodes using a high power wireless communication protocol (e.g., a cellular data communication protocol). In some examples, the mobile gateway tape node 436 is adhered to a mobile vehicle (e.g., a truck). In these examples, the mobile gateway 412 may be moved to different locations in the environment 400 to assist in connecting other tape nodes to the server 404. In some examples, the stationary gateway tape node 414 may be attached to a stationary structure (e.g., a wall) in the environment 400 with a known geographic location. In these examples, other tape nodes in the environment can determine their geographic location by querying the gateway tape node 414.

Wireless Communications Network

Figure 8:
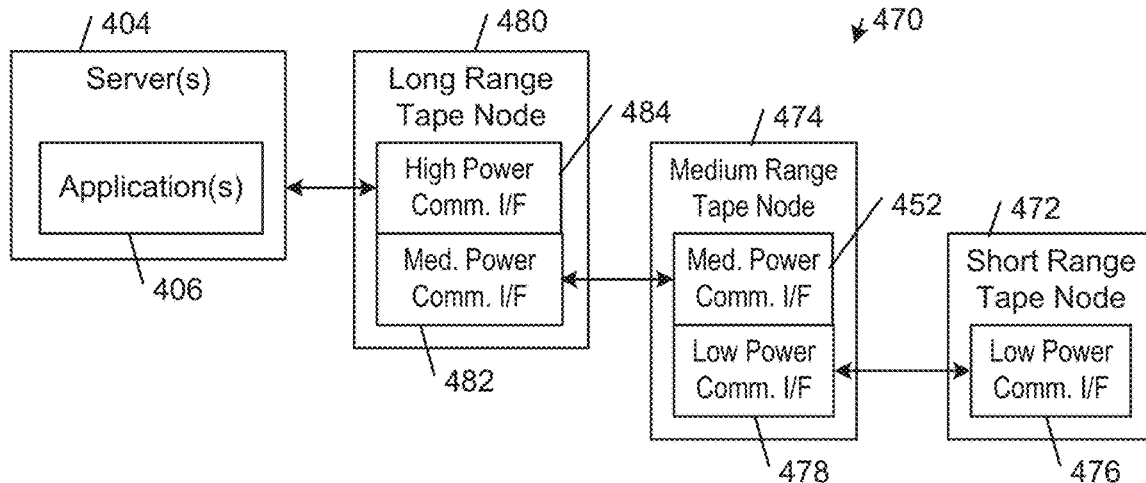
FIG. 8 is a diagrammatic view of a hierarchical communications network, according to some embodiments.

FIG. 8 shows an example hierarchical wireless communications network of tape nodes 470. In this example, the short range tape node 472 and the medium range tape node 474 communicate with one another over their respective low power wireless communication interfaces 476, 478. The medium range tape node 474 and the long range tape node 480 communicate with one another over their respective medium power wireless communication interfaces 478, 482. The long range tape node 480 and the network server 404 communicate with one another over the high power wireless communication interface 484. In some examples, the low power communication interfaces 476, 478 establish wireless communications with one another in accordance with the Bluetooth LE protocol, the medium power communication interfaces 452, 482 establish wireless communications with one another in accordance with the LoRa communications protocol, and the high power communication interface 484 establishes wireless communications with the server 404 in accordance with a cellular communications protocol.

In some examples, the different types of tape nodes are deployed at different levels in the communications hierarchy according to their respective communications ranges, with the long range tape nodes generally at the top of the hierarchy, the medium range tape nodes generally in the middle of the hierarchy, and the short range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, a server 404 of the network service 408 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more assets containing respective assets. In order to conserve power, the tape nodes typically communicate according to a schedule promulgated by the server 404 of the network service 408. The schedule usually dictates all aspects of the communication, including the times when particular tape nodes should communicate, the mode of communication, and the contents of the communication. In one example, the server 404 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server network node 404, either directly or indirectly through a gateway tape node (e.g., the long range tape node 416 adhered to the mobile vehicle 412 or the long range tape node 414 adhered to an infrastructure component of the environment 400). In other examples, the master tape node processes the information contained in the received data packets and transmits the processed information to the server network node 404.

Figure 9:
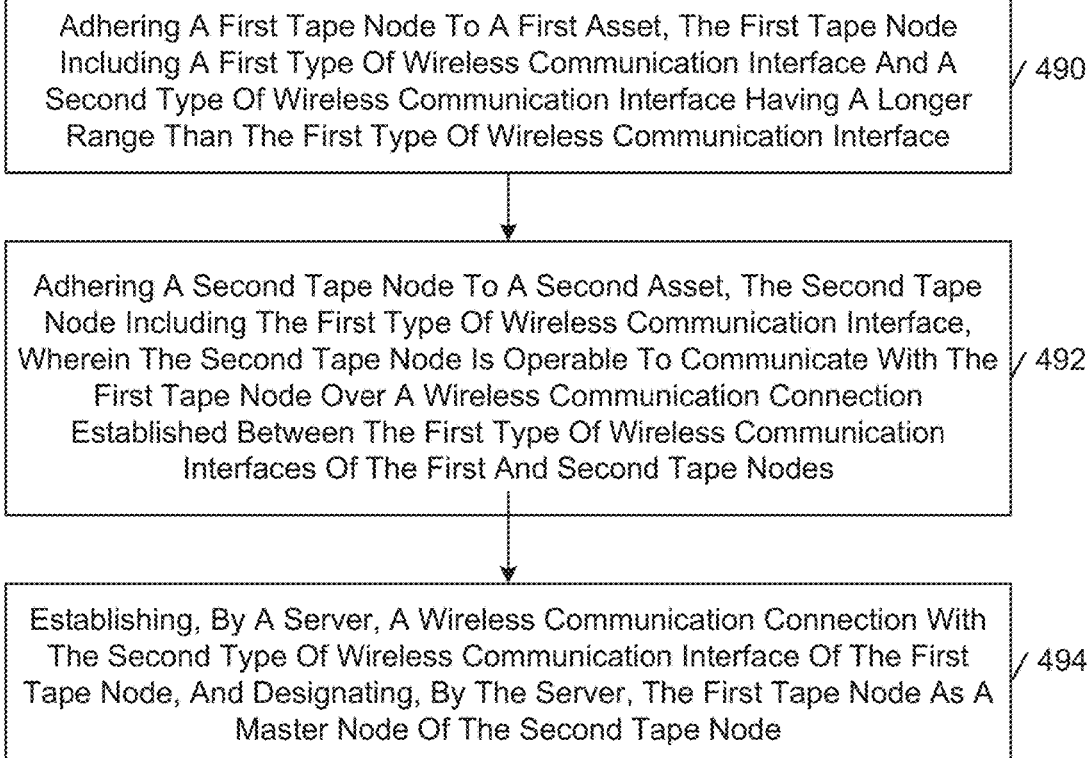
FIG. 9 is a flow diagram of a method of creating a hierarchical communications network, according to some embodiments.

FIG. 9 shows an example method of creating a hierarchical communications network. In accordance with this method, a first tape node is adhered to a first asset in a set of associated assets, the first tape node including a first type of wireless communication interface and a second type of wireless communication interface having a longer range than the first type of wireless communication interface (FIG. 9, block 490). A second tape node is adhered to a second asset in the set, the second tape node including the first type of wireless communication interface, wherein the second tape node is operable to communicate with the first tape node over a wireless communication connection established between the first type of wireless communication interfaces of the first and second tape nodes (FIG. 9, block 492). An application executing on a computer system (e.g., a server 404 of a network service 408) establishes a wireless communication connection with the second type of wireless communication interface of the first tape node, and the application transmits programmatic code executable by the first tape node to function as a master tape node with respect to the second tape node (FIG. 9, block 494).

In other embodiments, the second tape node is assigned the role of the master node of the first tape node.

Distributed Agent Operating System

As used herein, the term "node" refers to both a tape node and a non-tape node (i.e., a node or wireless device that is not an adhesive tape platform) unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node may be assigned a respective unique identifier, according to some embodiments.

The following disclosure describes a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs).

In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces). A node's mission (or objective) is defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services define the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server.

Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower power level, temperature reading, send an alert to local hub, send location data, triangulate location, any boxes in same group that already completed group objectives.

Nodes can be associated with items. Examples of an item includes, but are not limited to for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the items.

Communication paths between tape and/or non-tape nodes may be represented by a graph of edges between the corresponding assets (e.g., a storage unit, truck, or hub). In some embodiments, each node in the graph has a unique identifier. A set of connected edges between nodes is represented by a sequence of the node identifiers that defines a communication path between a set of nodes.

Figure 10A:
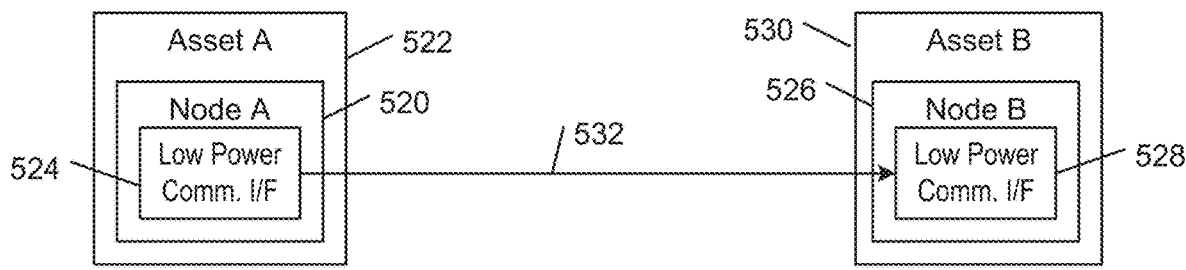
FIGS. 10A-10E are diagrammatic views of exemplary use cases for a distributed agent operating system, according to some embodiments.

Referring to FIG. 10A, a node 520 (Node A) is associated with an asset 522 (Asset A). In some embodiments, the node 520 may be implemented as a tape node that is used to seal the asset 522 or it may be implemented as a label node that is used to label the asset 522; alternatively, the node 520 may be implemented as a non-tape node that is inserted within the asset 522 or embedded in or otherwise attached to the interior or exterior of the asset 522. In the illustrated embodiment, the node 520 includes a low power communications interface 524 (e.g., a Bluetooth Low Energy communications interface). Another node 526 (Node B), which is associated with another asset 530 (Asset B), is similarly equipped with a compatible low power communications interface 528 (e.g., a Bluetooth Low Energy communications interface).

In an example scenario, in accordance with the programmatic code stored in its memory, node 526 (Node B) requires a connection to node 520 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 520 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 532 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 10B:
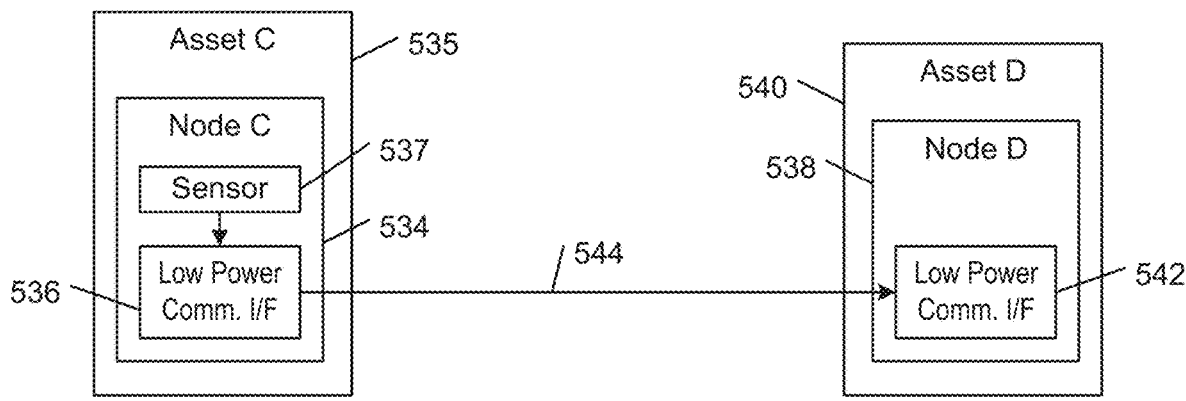

Referring to FIG. 10B, a node 534 (Node C) is associated with an asset 535 (Asset C). In the illustrated embodiment, the Node C includes a low power communications interface 536 (e.g., a Bluetooth Low Energy communications interface), and a sensor 537 (e.g., a temperature sensor). Another node 538 (Node D), which is associated with another asset 540 (Asset D), is similarly equipped with a compatible low power communications interface 542 (e.g., a Bluetooth Low Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 544 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 10C:
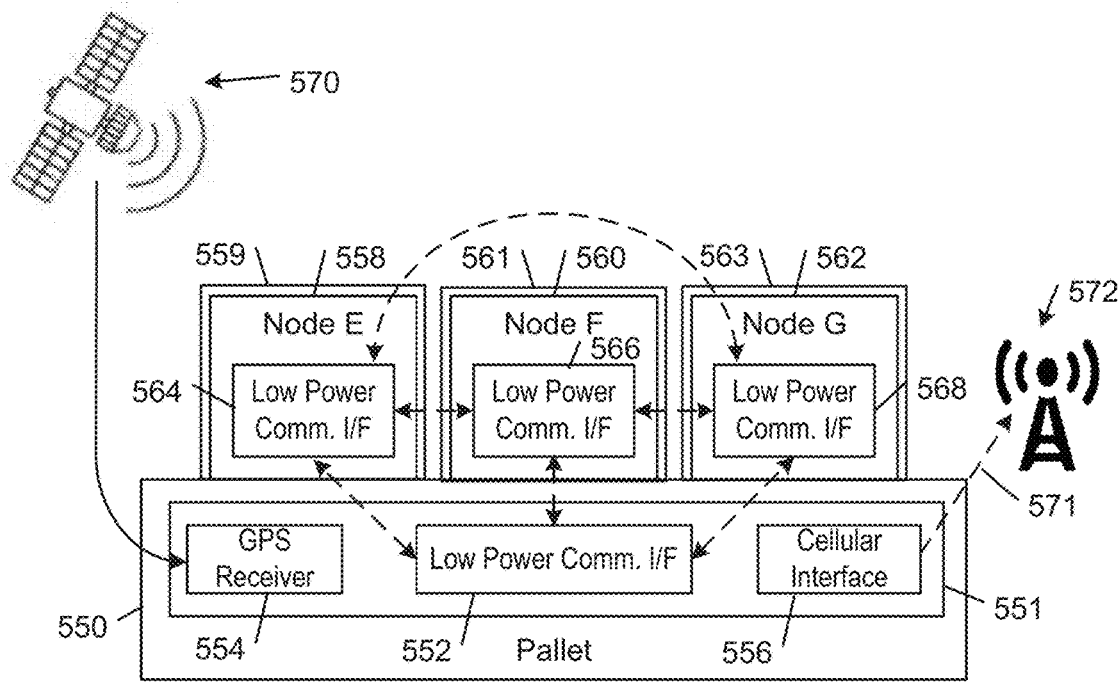

Referring to FIG. 10C, a pallet 550 is associated with a master node 551 that includes a low power communications interface 552, a GPS receiver 554, and a cellular communications interface 556. In some embodiments, the master node 551 may be implemented as a tape node or a label node that is adhered to the pallet 550. In other embodiments, the master node 551 may be implemented as a non-tape node that is inserted within the body of the pallet 550 or embedded in or otherwise attached to the interior or exterior of the pallet 550.

The pallet 550 provides a structure for grouping and containing assets 559, 561, 563 each of which is associated with a respective peripheral node 558, 560, 562 (Node E, Node F, and Node G). Each of the peripheral nodes 558, 560, 562 includes a respective low power communications interface 564, 566, 568 (e.g., Bluetooth Low Energy communications interface). In the illustrated embodiment, each of the nodes E, F, G and the master node 551 are connected to each of the other nodes over a respective low power communications path (shown by dashed lines).

In some embodiments, the assets 559, 561, 563 are grouped together because they are related. For example, the assets 559, 561, 563 may share the same shipping itinerary or a portion thereof. In an example scenario, the master pallet node 550 scans for advertising packets that are broadcasted from the peripheral nodes 558, 560, 562. In some examples, the peripheral nodes broadcast advertising packets during respective scheduled broadcast intervals. The master node 551 can determine the presence of the assets 559, 561, 563 in the vicinity of the pallet 550 based on receipt of one or more advertising packets from each of the nodes E, F, and G. In some embodiments, in response to receipt of advertising packets broadcasted by the peripheral nodes 558, 560, 562, the master node 551 transmits respective requests to the server to associate the master node 551 and the respective peripheral nodes 558, 560, 562. In some examples, the master tape node requests authorization from the server to associate the master tape node and the peripheral tape nodes. If the corresponding assets 559, 561, 563 are intended to be grouped together (e.g., they share the same itinerary or certain segments of the same itinerary), the server authorizes the master node 551 to associate the peripheral nodes 558, 560, 562 with one another as a grouped set of assets. In some embodiments, the server registers the master node and peripheral tape node identifiers with a group identifier. The server also may associate each node ID with a respective physical label ID that is affixed to the respective asset.

In some embodiments, after an initial set of assets is assigned to a multi-asset group, the master node 551 may identify another asset arrives in the vicinity of the multi-asset group. The master node may request authorization from the server to associate the other asset with the existing multi-asset group. If the server determines that the other asset is intended to ship with the multi-asset group, the server instructs the master node to merge one or more other assets with currently grouped set of assets. After all assets are grouped together, the server authorizes the multi-asset group to ship. In some embodiments, this process may involve releasing the multi-asset group from a containment area (e.g., customs holding area) in a shipment facility.

In some embodiments, the peripheral nodes 558, 560, 562 include environmental sensors for obtaining information regarding environmental conditions in the vicinity of the associated assets 559, 561, 563. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 551 can determine its own location based on geolocation data transmitted by a satellite-based radio navigation system 570 (e.g., GPS, GLONASS, and NAVSTAR) and received by the GPS receiver 554 component of the master node 551. In an alternative embodiment, the location of the master pallet node 551 can be determined using cellular based navigation techniques that use mobile communication technologies (e.g., GSM, GPRS, CDMA, etc.) to implement one or more cell-based localization techniques. After the master node 551 has ascertained its location, the distance of each of the assets 559, 561, 563 from the master node 551 can be estimated based on the average signal strength of the advertising packets that the master node 551 receives from the respective peripheral node. The master node 551 can then transmit its own location and the locations of the asset nodes E, F, and G to a server over a cellular interface connection with a cell tower 572. Other methods of determining the distance of each of the assets 559, 561, 563 from the master node 551, such as Received Signal-Strength Index (RSSI) based indoor localization techniques, also may be used.

In some embodiments, after determining its own location and the locations of the peripheral nodes, the master node 551 reports the location data and the collected and optionally processed (e.g., either by the peripheral nodes peripheral nodes 558, 560, 562 or the master node 551) sensor data to a server over a cellular communication path 571 on a cellular network 572.

In some examples, nodes are able to autonomously detect logistics execution errors if assets that suppose to travel together no longer travel together, and raise an alert. For example, a node (e.g., the master node 551 or one of the peripheral nodes 558, 560, 562) alerts the server when the node determines that a particular asset 559 is being or has already been improperly separated from the group of assets. The node may determine that there has been an improper separation of the particular asset 559 in a variety of ways. For example, the associated node 558 that is bound to the particular asset 559 may include an accelerometer that generates a signal in response to movement of the asset from the pallet. In accordance with its intelligent agent program code, the associated node 558 determines that the master node 551 has not disassociated the particular asset 559 from the group and therefore broadcasts advertising packets to the master node, which causes the master node 551 to monitor the average signal strength of the advertising packets and, if the master node 551 determines that the signal strength is decreasing over time, the master node 551 will issue an alert either locally (e.g., through a speaker component of the master node 551) or to the server.

Figure 10D:
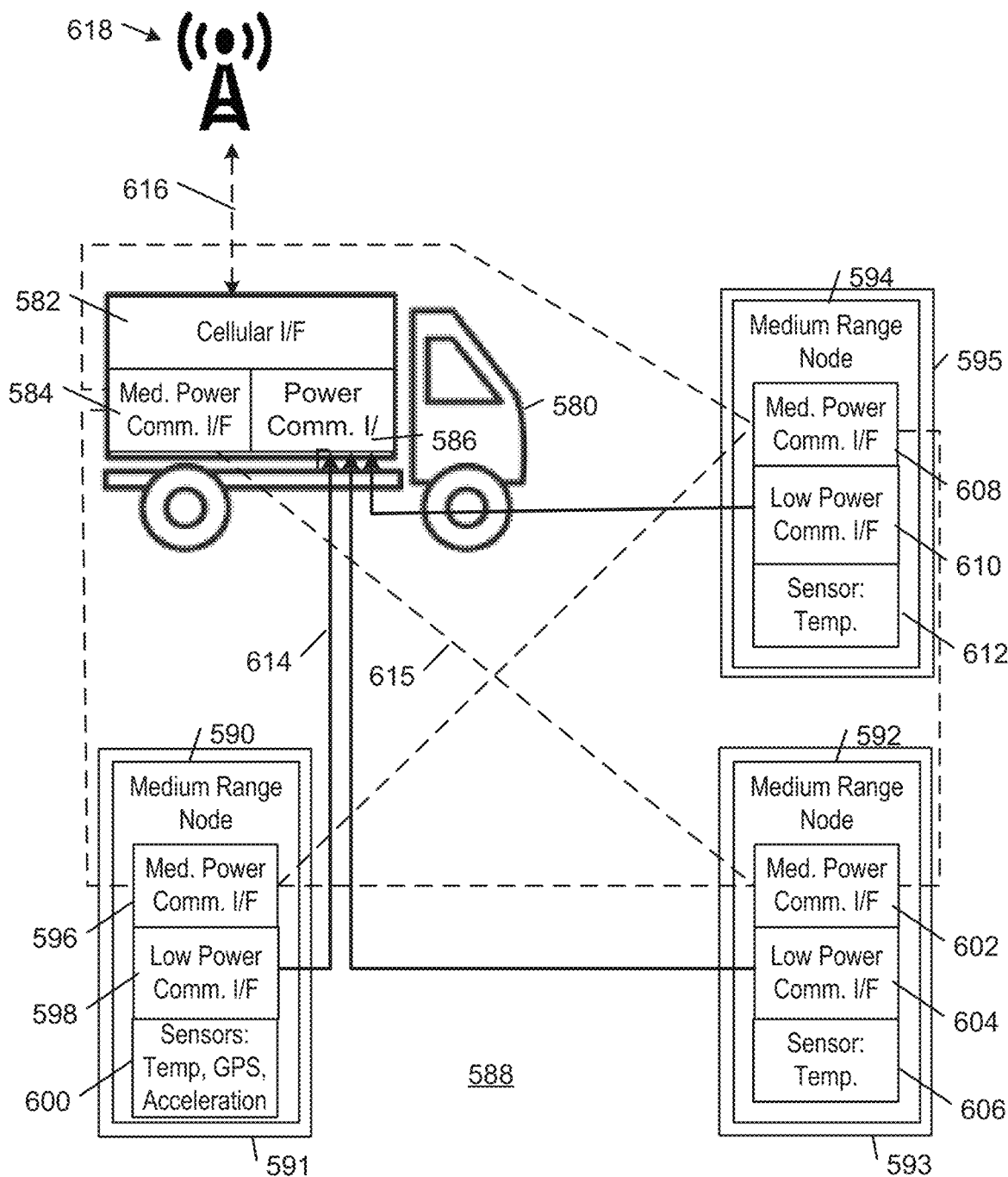

Referring to FIG. 10D, a truck 580 is configured as a mobile node or mobile hub that includes a cellular communications interface 582, a medium power communications interface 584, and a low power communications interface 586. The communications interfaces 580-586 may be implemented on one or more tape and non-tape nodes. In an illustrative scenario, the truck 580 visits a storage facility, such as a warehouse 588, to wirelessly obtain temperature data generated by temperature sensors in the medium range nodes 590, 592, 594. The warehouse 588 contains nodes 590, 592, and 594 that are associated with respective assets 591, 593, 595. In the illustrated embodiment, each node 590-594 is a medium range node that includes a respective medium power communications interface 596, 602, 608, a respective low power communications interface 598, 604, 610 and one or more respective sensors 600, 606, 612. In the illustrated embodiment, each of the asset nodes 590, 592, 594 and the truck 580 is connected to each of the other ones of the asset nodes through a respective medium power communications path (shown by dashed lines). In some embodiments, the medium power communications paths are LoRa formatted communication paths.

In some embodiments, the communications interfaces 584 and 586 (e.g., a LoRa communications interface and a Bluetooth Low Energy communications interface) on the node on the truck 580 is programmed to broadcast advertisement packets to establish connections with other network nodes within range of the truck node. A warehouse 588 includes medium range nodes 590, 592, 594 that are associated with respective containers 591, 593, 595 (e.g., assets, boxes, pallets, and the like). When the truck node's low power interface 586 is within range of any of the medium range nodes 590, 592, 594 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 590, 592, 594, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 614 or a LoRa formatted communication path 615), the truck node determines the identity information for the medium range node 590 (e.g., a peripheral node), the medium range node's capabilities include retrieving temperature data, and the medium range node's services include transmitting temperature data to other nodes. Depending of the size of the warehouse 588, the truck 580 initially may communicate with the nodes 590, 592, 594 using a low power communications interface (e.g., Bluetooth Low Energy interface). If any of the anticipated nodes fails to respond to repeated broadcasts of advertising packets by the truck 580, the truck 580 will try to communicate with the non-responsive nodes using a medium power communications interface (e.g., LoRa interface). In response to a request from the truck node 584, the medium range node 590 transmits an indication of its measured temperature data to the truck node. The truck node repeats the process for each of the other medium range nodes 592, 594 that generate temperature measurement data in the warehouse 588. The truck node reports the collected (and optionally processed, either by the medium range nodes 590, 592, 594 or the truck node) temperature data to a server over a cellular communication path 616 with a cellular network 618.

Figure 10E:
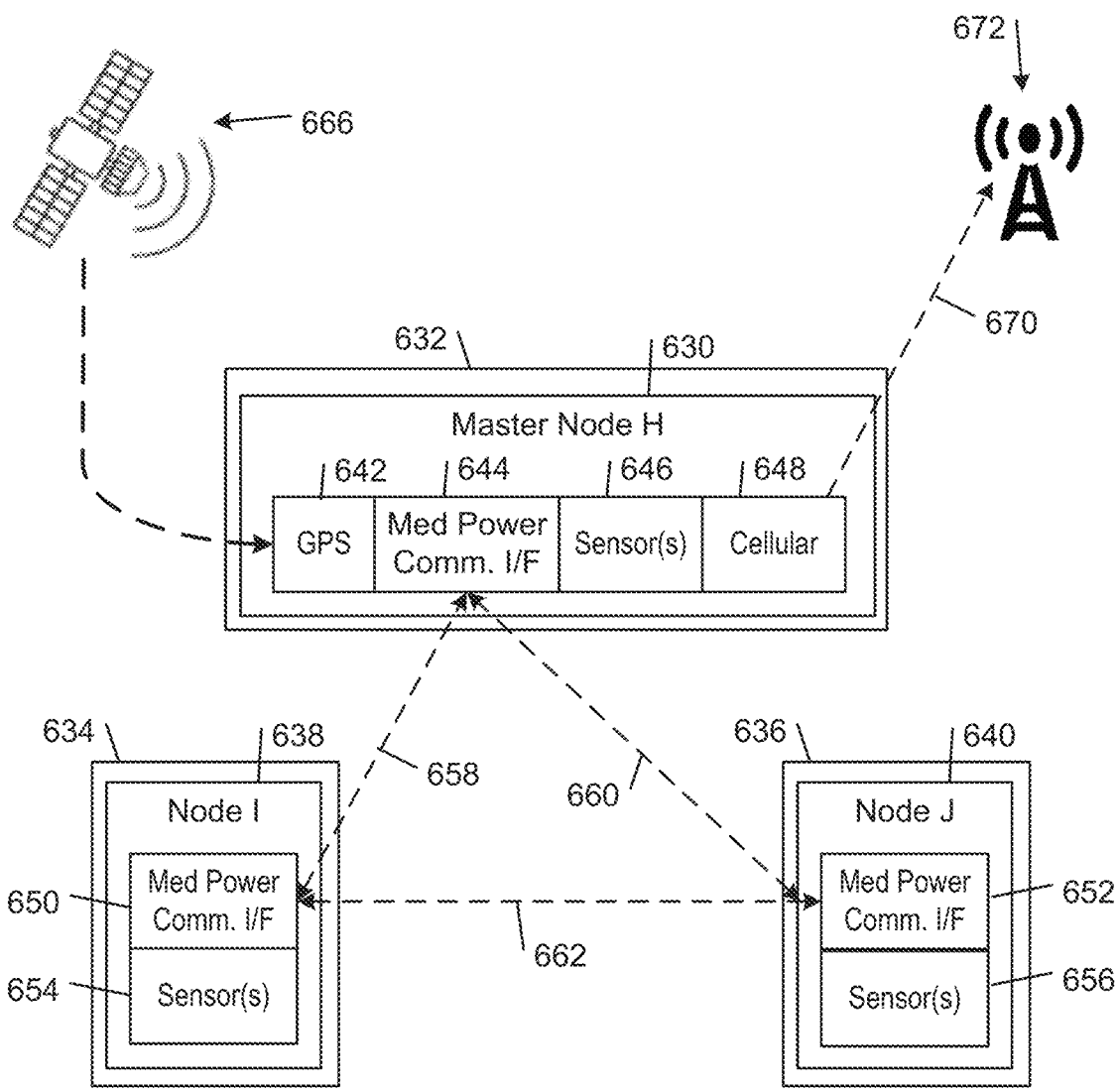

Referring to FIG. 10E, a master node 630 is associated with an item 632 (e.g., an asset) and grouped together with other items 634, 636 (e.g., assets) that are associated with respective peripheral nodes 638, 640. The master node 630 includes a GPS receiver 642, a medium power communications interface 644, one or more sensors 646, and a cellular communications interface 648. Each of the peripheral nodes 638, 640 includes a respective medium power communications interface 650, 652 and one or more respective sensors 654, 656. In the illustrated embodiment, the peripheral and master nodes are connected to one another other over respective pairwise communications paths (shown by dashed lines). In some embodiments, the nodes 630 638, 640 communicate through respective LoRa communications interfaces over LoRa formatted communications paths 658, 660, 662.

In the illustrated embodiment, the master and peripheral nodes 638, 638, 640 include environmental sensors for obtaining information regarding environmental conditions in the vicinity of the associated assets 632, 634, 636. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 630 periodically broadcasts advertising packets in the surrounding area. When the peripheral nodes 638, 640 are within range of master node 630, and are operating in a listening mode, the peripheral nodes 638, 640 will extract the address of master node 630 and potentially other information (e.g., security information) from the advertising packets. If, according to their respective programmatic code, the peripheral nodes 638, 640 determine that hey are authorized to connect to the master node 630, the peripheral nodes 638, 640 will attempt to pair with the master node 630. In this process, the peripheral nodes 638, 640 and the master node and the peripheral nodes determine each other's identities, capabilities, and services. For example, after successfully establishing a respective communication path 658, 660 with each of the peripheral nodes 638, 640 (e.g., a LoRa formatted communication path), the master node 630 determines certain information about the peripheral nodes 638, 640, such as their identity information (e.g., peripheral nodes), their capabilities (e.g., measuring temperature data), and their services include transmitting temperature data to other nodes.

After establishing LoRa formatted communications paths 658, 660 with the peripheral nodes 638, 640, the master node 630 transmits requests for the peripheral nodes 638, 640 to transmit their measured and/or locally processed temperature data to the master node 630.

In the illustrated embodiment, the master node 630 can determine its own location based on geolocation data transmitted by a satellite-based radio navigation system 666 (e.g., GPS, GLONASS, and NAVSTAR) and received by the GPS receiver 642 component of the master node 630. In an alternative embodiment, the location of the master node 630 can be determined using cellular based navigation techniques that use mobile communication technologies (e.g., GSM, GPRS, CDMA, etc.) to implement one or more cell-based localization techniques. After the master node 630 has ascertained its location, the distance of each of the assets 634, 636 from the master node 630 can be estimated based on the average signal strength of the advertising packets that the master node 630 receives from the respective peripheral node. The master node 630 can then transmit its own location and the locations of the asset nodes E, F, and G to a server over a cellular interface connection with a cell tower 672. Other methods of determining the distance of each of the assets 634, 636 from the master node 630, such as Received Signal-Strength Index (RSSI) based indoor localization techniques, also may be used.

In some embodiments, after determining its own location and the locations of the peripheral nodes, the master node 630 reports the location data the collected and optionally processed (e.g., either by the peripheral nodes peripheral nodes 634, 636 or the master node 630) sensor data to a server over a cellular communication path 670 on a cellular network 672.

Pre-Deployment Auditing of Tape Node

When using a large network of wireless internet of things (IOT) devices in an IOT system, IOT devices that are defective may not be suitable for deployment in the field. When deploying a large number of IOT devices (e.g., hundreds or thousands of IOT devices), it is difficult to identify the defective IOT devices before deployment. Deploying a defective IOT device may result in costly failure to perform functions with the IOT system. For example, if the IOT system is being used to track assets by deploying wireless tracking devices (i.e., the wireless IOT devices), deploying defective wireless tracking devices may result in the inability to track sensitive or important assets.

Disclosed herein are methods and systems for performing audits (including diagnostic testing of hardware and software functionality) of wireless IOT devices, prior to deployment of the wireless IOT devices in the field. In some embodiments, the wireless IOT devices are tape nodes which are embodiments of the adhesive tape platform with the adhesive tape form factor. The wireless IOT devices will be referred to as tape nodes, herein. The tape nodes are part of an embodiment of the IOT system 400 shown in FIG. 7.

An audit performed on a tape node determines if the tape node is in an allowable condition for performing a task assigned to the tape node by the IOT system. For example, if the IOT system assigns a tape node to perform location tracking using GPS, an audit may be performed on the tape node to determine if a GPS communication system of the tape node is functioning correctly. If during the audit, it is determined that the tape node's GPS communication system is malfunctioning or defective, the tape node fails the audit. In response to a failed audit, the IOT system 400 initiates a replacement of the tape node for the task. In some embodiments, the IOT system may does this by notifying a user or human operator via a client device that the tape node has failed the audit and needs to be replaced. In further embodiments, an interface is shown on the client device which displays the status and/or result of the audit. An example interface is discussed below with respect to FIG. 14.

The tape nodes include hardware components and software for performing self-diagnostic testing. The hardware components may include circuits for testing the functionality of one or more hardware components. The tape nodes are tested during manufacturing for any possible defects, but sometimes defects or other damage may occur during shipping, storing, or some other phase before deployment in the field. The tape nodes are equipped to perform remote, self-diagnostic testing responsive receiving instructions from the IOT system 400 or in response to a predetermined diagnostic testing schedule.

In some embodiments, the audit includes configuring settings of a tape node for a task assigned to the tape node. The configuring of the settings may include programming of the tape node with executable programmatic code. The settings configuration may be transmitted from the IOT system 400, in some embodiments. In some examples, the configuring of the settings results in the activation or deactivation of certain hardware or software components. For example, for a task that does not require GPS tracking, an audit may include configuring the settings of the tape node to deactivate or disable its GPS communication system. This may be beneficial to save resources such as battery life during the task.

Diagnostic testing data collected during the audit and the result of the audit are transmitted to the IOT system 400 and stored in a database (e.g., database 408) and/or on the cloud, according to some embodiments. Members of the IOT system 400 may access the database to identify which tape nodes are defective, before they are deployed. A user of the IOT system 400 may view the accessed data using a client device, for example, to determine if a tape node needs to be replaced before deploying the tape node to perform a task.

An audit of one or more tape nodes may be performed between and/or during any one of multiple phases before the tape nodes are deployed. FIG. 11 is a diagram showing a sequence 1100 of example phases for a tape node prior to and leading up to the deployment of the tape node, according to some embodiments. The tape node is assigned a task by the IOT system 400 and includes one or more hardware and/or software components for completing the task. In some embodiments, a tape node undergoes an audit between each phase 1110, 1120, 1130, 1140, 1150 prior to deployment. If the tape node passes all of the audits, the tape node is deployed for performing the task.

The sequence 1100 of phases for a tape node includes a storage phase 1110 when the tape node is stored in a container with multiple other tape nodes. The container may be stored in a storage area. In some embodiments, the tape node is part of a roll or length of tape nodes, as shown, for example, in FIGS. 1A and 4. In other embodiments, the tape node is otherwise part of a group of tape nodes. For example, the tape node may be one of a group of tape nodes on a backing sheet, like the tape node 32 shown in FIG. 2. Multiple rolls, lengths, or groups of tape nodes may be stored in the container. In some embodiments, the IOT system 400 detects the storage phase 1110 based on determining that the tape nodes have not moved for a threshold period of time. In other embodiments, the IOT system 400 detects the storage phase 1110 based on determining that the tape node is at a location corresponding to a storage area. In other embodiments the IOT system 400 detects the storage phase 1110 based on receiving a notification that the tape node has not been deployed or based on a lack of a received signal indicating that the tape node has been deployed. In other embodiments, the IOT system 400 detects the storage phase 1110 using other methods.

The next phase is a retrieval phase 1120, during which the container is moved and the tape node is retrieved from the container. In some embodiments, a user moves the container from the storage area to an area for deploying tape nodes. The user may then proceed to retrieve one or more tape nodes, groups of tape nodes, and/or rolls of tape nodes, including the tape node, from the container. In some embodiments, the IOT system 400 detects that the container has been moved based on determining that a group of tape nodes stored together in the container has changed locations or moved. In some embodiments, the IOT system 400 detects the retrieval phase based on determining that the container has been opened. For example, the container may be outfitted with a tape node or other device that detects when the contain has been opened. In other methods, the IOT system 400 detects the retrieval phase 1120 using other methods.

After the retrieval phase 1120, a dispensing phase 1130 begins when the tape node is separated from an associated group of tape nodes. The group of tape nodes may be a roll or length of tape nodes that includes the tape node. In some embodiments, the tape node transmits a notification to the IOT system 400 when the tape node is separated from the associated group. For example, the tape node may include a wake circuit that is activated when the tape node is separated from the roll or length, like what is shown in FIGS. 6A-6C. The wake circuit may initiate the transmission of the notification to the IOT system 400. Based on the notification, the IOT system may detect the dispensing phase 1130. In other embodiments, the IOT system detects the dispensing phase 1130 based on other methods.

The tape node then enters a mounting phase 1140 when the tape node is mounted on an asset. The tape node, for example, may be adhered to an asset that the tape node will track as part of the task assigned to the tape node by the IOT system 400. In some embodiments, the tape node is initialized at the start of or during the mounting phase 1140. For example, the tape node may be in response to a user interacting with tape node (e.g., pressing a button on the tape node, shaking the tape node, connecting to the tape node with a client device, scanning a barcode on the tape node, or some other interaction). As part of the initialization the tape node may transmit a notification to the IOT system 400, which in turn detects the mounting phase 1140. In other embodiments, the IOT system 400 detects the mounting phase based on sensor data received from the tape node. In other embodiments, the IOT system 400 detects the mounting phase using other methods.

The tape node then enters the final deployment phase 1150 when the tape node is deployed in the field to perform its assigned task.

Between two of the phases of the sequence 1100, an audit may be performed on the tape node to determine if the tape node is capable of completing the assigned task. In some embodiments, an audit is performed between each of the phases of the sequence 1100. A different type of audit may be performed on the tape node based on which phases the audit is being performed between. Each type of audit may be initiated and/or performed by a different member of the IOT system (e.g., the tape node itself, another tape node, a client device, a gateway device, one or more servers, the cloud, or another member of the IOT system 400). The audit may be performed by transmitting instructions to the tape node to perform one or more diagnostic tests on one or more of its hardware or software resources/components. An example of a diagnostic test would be checking a battery level of the tape node. Data collected by the tape node during the one or more diagnostic test is then transmitted to the member of the IOT system that is performing and/or initiated the audit. The member of the IOT system then determines if the tape node passes the audit based on the received data. The conditions for passing the audit is based on the requirements of the assigned task. In the example of the battery level check, the member of the IOT system may determine whether the tape node has passed the audit based on whether the battery level of the tape node is above a threshold value associated with the assigned task.

During and between the phases where the tape node is part of a group (phases 1110, 1120), the group of tape nodes may have audits performed on them simultaneously and/or in parallel. The audits in this case may not be specific to an assigned task, but rather may check for basic functionality and performance of the tape nodes, according to some embodiments. Thus, the tape nodes that are defective and don't meet basic requirements for functionality may be identified before a tape node has been selected or retrieved. In some embodiments, the tape nodes that are defective may be identified before task has been assigned to the tape nodes.

The IOT system 400 tracks which tape nodes have failed audits and are deemed defective. In some embodiments, a tape node that has failed an audit is flagged for further testing to validate the results of the audit. The IOT system 400 then assigns a different tape node to perform the task. The different tape node must pass all of its audits, before it is deployed. In some embodiments, a tape node which fails its audit is returned to a collection center for further testing and/or refurbishment.

The IOT system 400 may remotely perform a large number of audits (e.g., over hundreds or thousands) in parallel, without the need for a human operator to take action or intervene. The IOT system 400 saves time and effort for diagnostic testing.

Auditing Methods for IOT System

Figure 12:
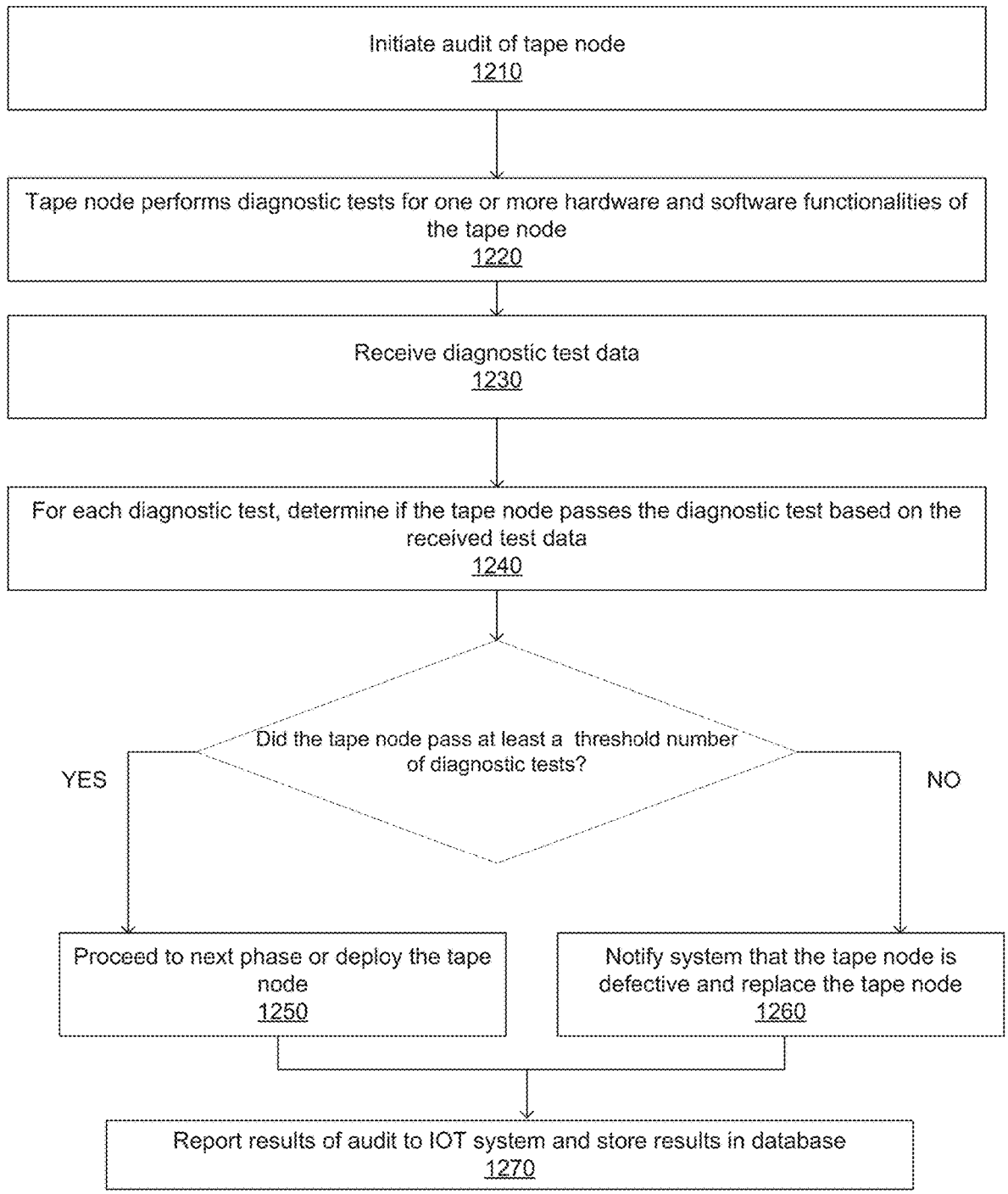
FIG. 12 shows an example method for performing an audit on a tape node, according to some embodiments.

FIG. 12 shows an example method 1200 for performing an audit on a tape node according to some embodiments. The method may be performed by one or more members of the IOT system 400. For purposes of discussion, the one or more members will be referred to as "the member." In some embodiments, the member is the tape node itself. For example, the tape node may store logic and instructions for performing the audit in its memory. The tape node may execute the logic and instructions locally without interacting with the cloud or other members of the IOT system, according to some embodiments.

The member initiates 1210 the audit of the tape node. In some embodiments, the member initiates 1210 the audit between one of the phases shown in FIG. 11, as discussed above. The member may transmit instructions to the tape node for performing the audit. The audit includes one or more diagnostic tests of the hardware and/or software components of the tape node. The one or more diagnostic tests may test functionality that is specifically required for a task assigned to the tape node, according to some embodiments. The instructions may include instructions for carrying out the one or more diagnostic tests. The instructions may be in the form of executable code or software according to some embodiments.

In response to receiving the instructions to initiate the audit from the member, the tape node performs 1220 the one or more diagnostic tests associated with the audit. The one or more diagnostic tests may include collecting data on relevant hardware or software components. For example, the tape node may check a battery level of the tape node. In another example, the tape node may test out the performance of a wireless communication system of the tape node (e.g., a GPS communication system). The accuracy and/or range of the wireless communication may be verified by the tape node and the IOT system 400, in some embodiments.

The tape node collects the data for the diagnostic tests and transmits to the member. The member receives 1230 the data from the tape node. In some embodiments, the data is transmitted over wireless communication directly from the tape node to the member. In other embodiments, the data is relayed from the tape node to the member via other members or nodes of the IOT system 400. The data may include data and metrics that are relevant to the performance of the one or more hardware and software components.

For each diagnostic test that is included in the audit, the member determines 1240 if the tape node has passed the diagnostic test based on the received diagnostic test data. Each diagnostic test may include a threshold of performance, according to some embodiments. The member determines 1240 that the tape node has passed the diagnostic test based at least in part on a portion of the received data being above the threshold of performance. For example, if the member receives data that the battery level of the tape node is a first value, the member determines 1240 that the tape node has passed a battery diagnostic test based on the first value being above a threshold value. The threshold value may be determined based on a type of task that is assigned to the tape node. For example, if the tape node is assigned a task to track the location of an asset for 4 days, the threshold value is a battery energy level that corresponds to tracking the location of the asset for 4 days.

If the member determines 1240 that the tape node has passed at least a threshold number of diagnostic tests, the tape node enters the next phase of pre-deployment (e.g., one of the phases of sequence 1100 shown in FIG. 11). It is determined that the tape node has thus passed the current audit. Alternatively, if it is determined that the tape node is ready for deployment based on the audit and the current phase of the tape node, the tape node is deployed 1250 in the field and begins performing its assigned task. If the member determines 1240 that the tape node has not passed at least the threshold number of diagnostic tests, the member notifies 1260 the IOT system 400 that the tape node is defective and should not be deployed in the field. The member or the IOT system 400 may also notify a user via a client device that the tape node is defective, and the user may replace the tape node with a functioning tape node, in response. Thus, the defective tape node may be prevented from being used to perform the task, and a failure during the task may be circumvented. The member determines 1240 that the tape node has thus failed the current audit. The tape node may also be replaced 1260, with a new tape node being assigned to the tape node's assigned task or tasks.

The member reports 1270 the results of the audit to the IOT system 400. The IOT system 400 tracks which tape nodes have passed their audits and which tape nodes have failed their audits. In some embodiments, the IOT system stores the results of the tape node in a database. The IOT system 400 may also receive and store the diagnostic test data from the member. In some embodiments, a user may view the current status and results of audits on tape nodes using a client device which accesses the stored data in the database.

Figure 13:
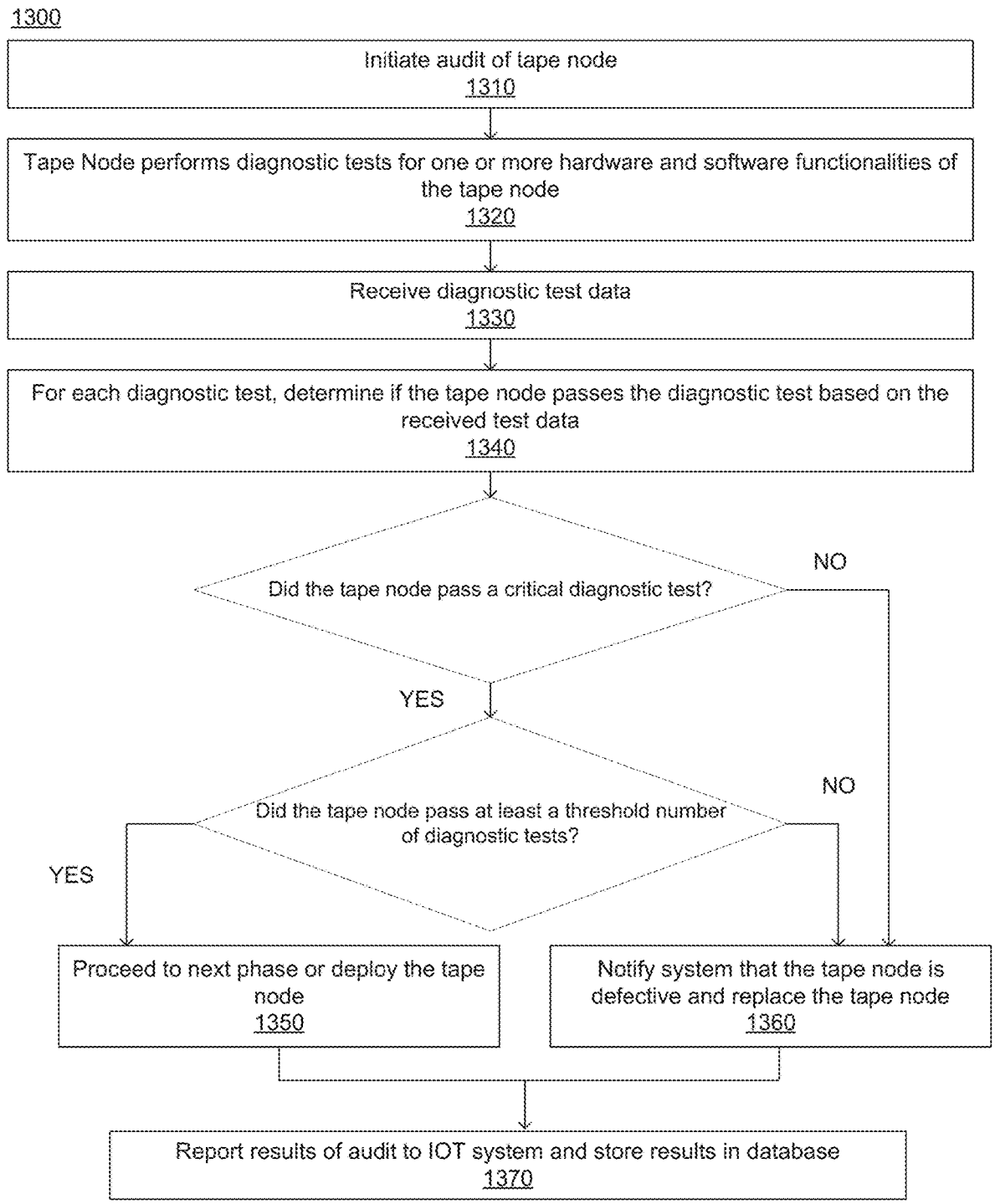
FIG. 13 shows an example method which is an alternate embodiment of the example method shown in FIG. 12 for performing an audit of a tape node, according to some embodiments.

FIG. 13 shows an example method 1300 which is an alternate embodiment of the example method 1200 shown in FIG. 12 for performing an audit of a tape node, according to some embodiments. The example method 1300 is substantially similar to the method 1200, with the exception that the member determines if the tape node passes the audit based at least in part on determining 1340 whether the tape node has passed a critical diagnostic test of the one or more diagnostic tests performed by the tape node. The aspects of the example method 1300 which are the same as the method 1200 will not be discussed below. If the tape node fails the critical diagnostic test, the member determines 1340 that the tape node has failed the audit and is defective. In some embodiments, the critical diagnostic test is associated with the task assigned to the tape node by the IOT system 400. In further embodiments, the tape node is assigned to a different task, responsive to failing the critical diagnostic test. For example, if the tape node fails a critical diagnostic test of its GPS communication system, the IOT system 400 may assign it to a new task that doesn't require GPS communications. In some embodiments, the tape node that failed the critical diagnostic test is only assigned to a new task, if it also has passed at least a threshold number of other diagnostic tests. In some embodiments, the critical diagnostic test includes a plurality of diagnostic tests.

In some embodiments, the tape node only passes the audit and proceeds to the next phase or proceeds to being deployed 1350 if the tape node has both passed the critical diagnostic test and passed at least a threshold number of diagnostic tests. In other embodiments, the tape node passes the audit if it has passed the critical diagnostic test.

In both example methods 1200 and 1300, the threshold number of diagnostic tests may be determined based on the task assigned to the tape node. The IOT system 400 may determine the threshold number based on historical data for the performance of tape nodes that have attempted to complete the same type of task. In some embodiments, a trained machine learning model is used to determine if the tape node has passed the audit. For example, a machine learning model may receive the historical data as an input and generate the threshold number of diagnostic tests. In other examples, the machine learning model may be trained on the historical data. In this case, the received diagnostic testing data from the tape node in the step 1230, 1330 may be provided as an input to the machine learning model, and the machine learning model classifies whether the tape node has passed each diagnostic test and/or passed the audit.

A method for performing the audit of the tape node may include additional and/or alternative steps to the ones shown in FIGS. 12 and 13.

User Interface for Viewing Audit Results for Tape Nodes

Figure 14:
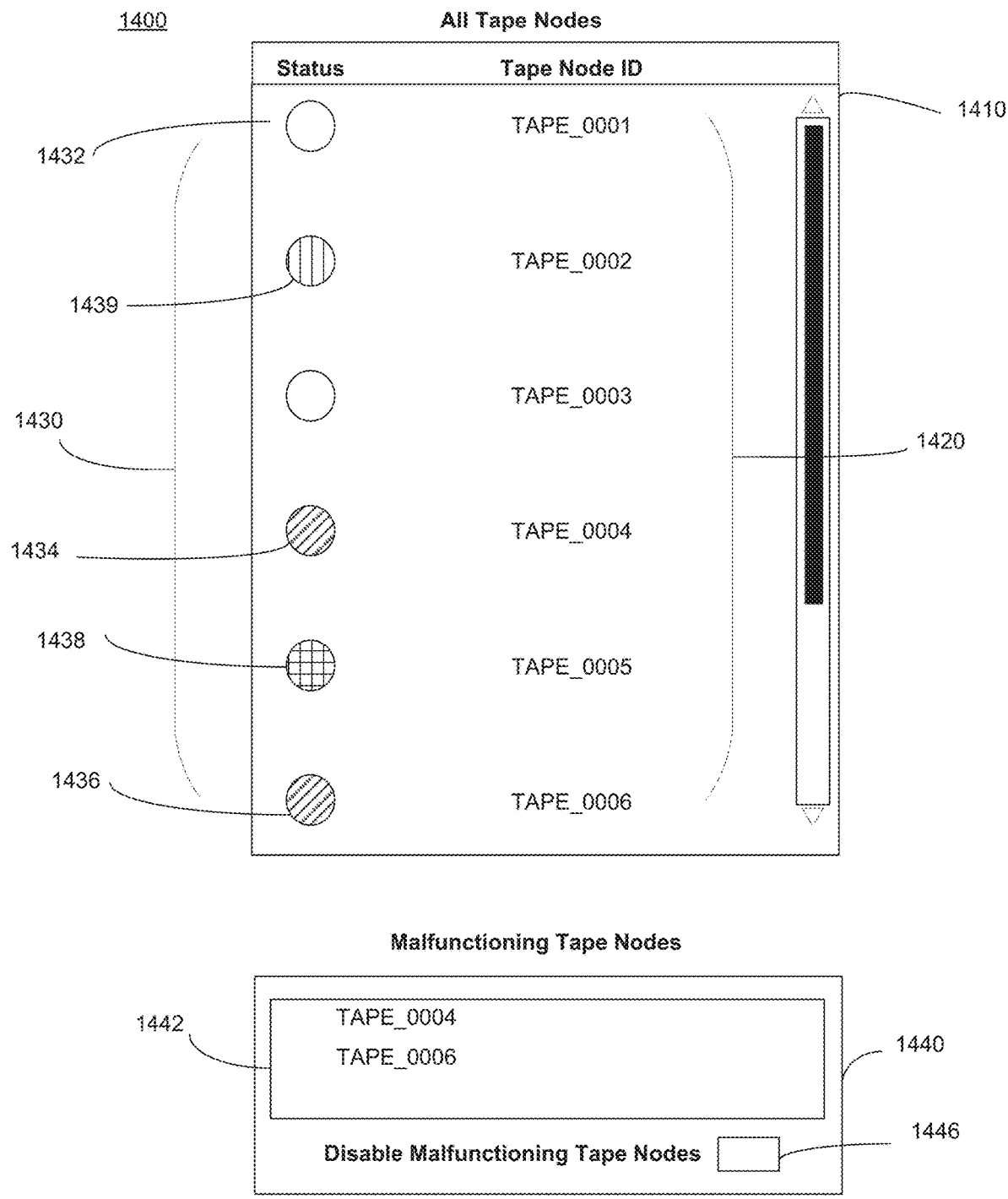
FIG. 14 shows an example interface for viewing the results of audits performed on tape nodes in an IOT system, according to some embodiments.

FIG. 14 shows example interface 1400 for viewing the results of audits performed on tape nodes in an IOT system, according to some embodiments. The example interface 1400 may be used by a user on a client device to view which tape nodes in an IOT system have completed audits, have not had audits performed on them, are in the process of performing an audit, the results of completed audits, and other information related to the tape nodes.

The example interface 1400 includes a status field 1410 which displays information on the tape nodes of the IOT system. On the right side of the status field 1410, a tape node list 1410 is shown which includes one or more tape nodes of the IOT system. In some embodiments, the tape node list 1410 may be filtered by various parameters. For example, the tape node list 1410 may be filtered by a group associated with the tape nodes (e.g., tape nodes from the same roll), a location of the tape nodes, a type of task assigned to the tape nodes, or some other parameter, according to some embodiments. The tape node list 1410 includes a tape node identifier of a tape node on each row of the tape node list 1410. In some embodiments the tape node identifier is a hardware identifier, a unique identifier, some other identifier, or some combination thereof.

On the left side of the status field 1410, a status indicator section 1430 includes graphical elements that correspond to the tape nodes of the tape node list 1410. Each graphical element indicates the status of a corresponding tape node on the tape node list 1410. The graphical element is displayed on the same row as its corresponding tape node. In the example shown in FIG. 14, each graphical element is a symbol that represent a status or condition of the corresponding tape node. The graphical element 1432 indicates that the tape node with the identifier TAPE_0001 has completed an audit and has passed the audit. The graphical elements 1434, 1436 indicate that the tape nodes with the identifiers TAPE_0004 and TAPE_0006 have completed their audits and have failed their audits. Thus, the graphical elements 1434 indicate that the tape nodes with the identifiers TAPE_0004 and TAPE_0006 are defective. The graphical element 1438 indicates that the tape node with the identifier TAPE_0005 is currently performing an audit that has not yet completed. The graphical element 1439 indicates that the tape node with the identifier TAPE_0002 in not currently performing an audit and has not performed an audit yet.

Other graphical elements may be used that are not shown in FIG. 14. For example, the status indicator section 1430 may include text that describes conditions or parameters of corresponding tape nodes in the tape node list 1420. Although information for 6 tape nodes is shown in the status field 1410, the status field 1410 may show information for a different number of tape nodes or may show different types of information.

The interface 1400 also includes a malfunctioning tape nodes field 1440. The malfunctioning tape nodes field 1440 includes a tape node list 1442 that includes all of the tape nodes that the IOT system has determined are defective, malfunctioning, or incapable of performing their assigned tasks. In the example of FIG. 14, the defective tape nodes with the identifiers TAPE_0004 and TAPE_0006 are listed, corresponding to the status indicated by the graphical elements displayed in the status indicator field 1430.

The malfunctioning tape nodes field 1440 also includes a disable interactive element 1446 that can be used to disable one or more of the malfunctioning tape nodes listed in the tape node list 1442. When a user interacts with the element 1446, the IOT system 400 may disable the selected malfunctioning tape nodes remotely. For example, the IOT system 400 may transmit instructions to the malfunctioning tape nodes to power down.

Using the interface 1400, the user may quickly identify which of the tape nodes are defective and take further actions in response. In some embodiments, the user may also find out the geographic or physical location of a tape node (e.g., a defective tape node) using the interface 1400.

Retrieving Audit Results from Databases

In some embodiments, audits for IOT devices such as tape nodes or other embodiments of an adhesive tape platform are conducted at the end of manufacturing processes, at the end of a first task, during recharging or refurbishment, or the like. Results from the audits are stored by a cloud or server of the IOT system 400. After the audits are conducted, tape nodes may enter a hibernation mode or an off mode, such that a current status of functionality, battery life, and the like at the time of the audit are maintained. By performing audits for tape nodes at the end of manufacturing processes or at the end of a task, the IOT system 400 is able to perform time-intensive diagnostic tests prior to new tasks being assigned and, as such, to reduce overhead time at the start of a new task being assigned to the tape node.

The results of the audits may be retrieved at a later time, e.g., at the beginning of a next task, and used to determine if the tape node is functional and capable of performing the next task assigned to the tape node. In some embodiments, users of the IOT system 400 use client devices to retrieve results of the audits from the cloud or server of the IOT system. For example, in an embodiment as discussed in conjunction with FIG. 1A, the tape node comprises a two-dimensional barcode 22, such as a QR code. Users of the IOT system 400 may scan the two-dimensional barcode or QR code using a client device to determine an identifier of the tape node. In some embodiments the tape node identifier is a hardware identifier, a unique identifier, some other identifier, or some combination thereof. The client device transmits a request to the IOT system 400 to retrieve audit results associated with the determined identifier, or establishes a communication channel with a cloud or server of the IOT system to access a database storing the audit results.

Based on the retrieved results, the client device determines whether the tape node is able to perform an assigned next task. As discussed previously, in some embodiments the tape node may pass the audit and proceed to deployment responsive to passing at least a threshold number of diagnostic tests. In other embodiments the tape node may pass the audit and proceed to deployment responsive to passing at least a critical diagnostic test or a specified set of critical diagnostic tests. In other embodiments the tape node may pass the audit and proceed to deployment responsive to passing at least a specified set of diagnostic tests corresponding to a next assigned task. For example, a next assigned task of tracking an asset over a short transportation may require a different specified set of diagnostic tests than a next assigned task of tracking a cold-storage asset over a long transportation.

Figure 15:
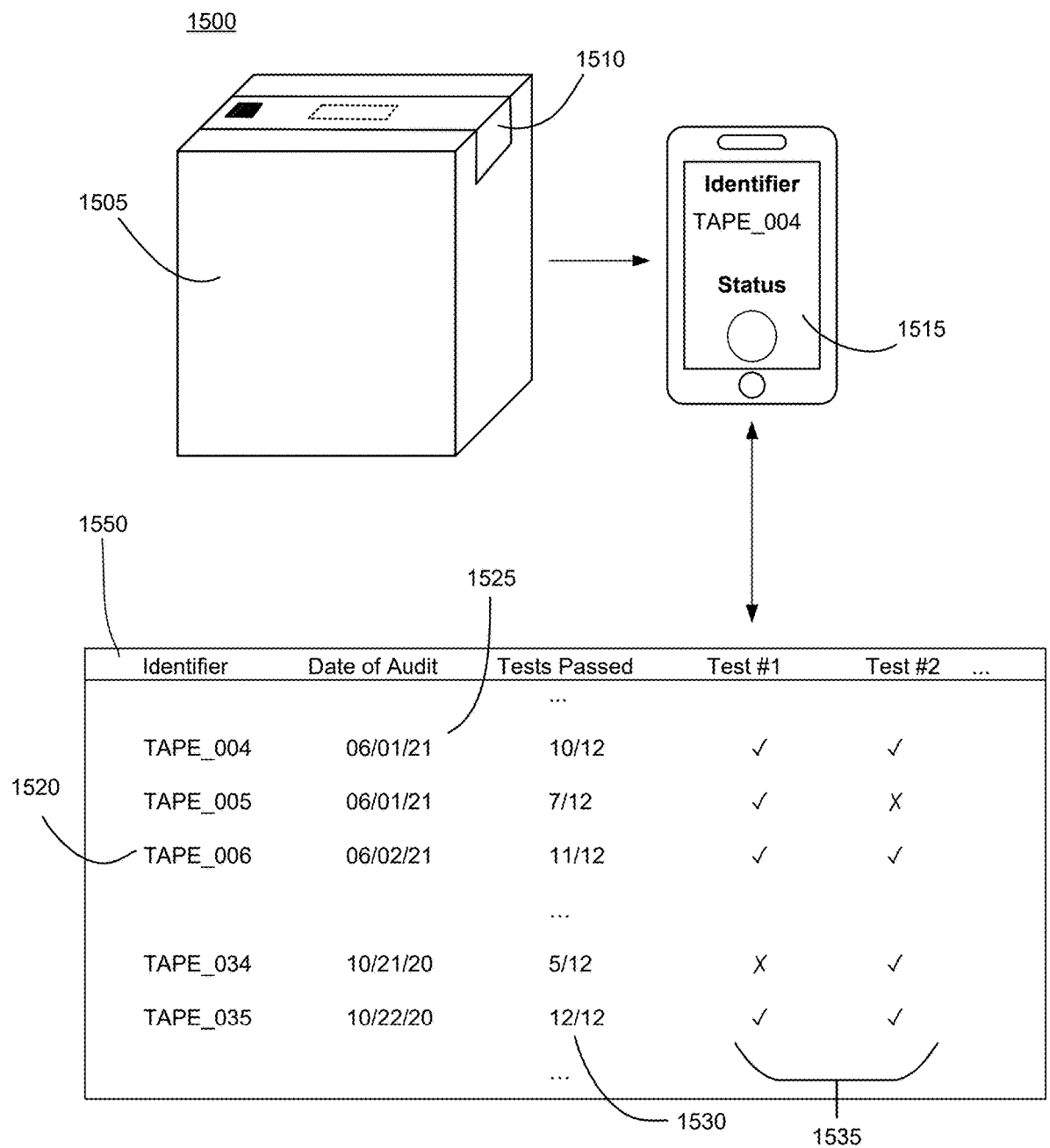
FIG. 15 shows an interaction diagram for retrieving results of audits performed on tape nodes in an IOT system, according to some embodiments.

FIG. 15 shows an interaction diagram 1500 for retrieving results of audits performed on tape nodes in an IOT system, according to some embodiments. A tape node 1510 being prepared for deployment of a next assigned task is adhered or affixed to an asset 1505. The tape node 1510 is associated with an identifier. A client device 1515 of a user of the IOT system is configured to receive identifiers of tape node. For example, in some embodiments the client device 1515 is configured to scan a two-dimensional barcode 22 of the tape node 1510, one or more identifiers of the tape node 1510 encoded in the two-dimensional barcode 22. In other embodiments, the client device 1515 receives an identifier as input by a user of the client device, e.g., as text, as a data file. In some embodiments, the client device 1515 retrieves (e.g., by scanning the two-dimensional barcode 22) or receives the identifiers for the tape node 1510, before the tape node 1510 is adhered to the asset 1505. For example, a user may wish to check the audit results for the tape node 1510 before selecting it for use in tracking the asset 1515.

Responsive to receiving the identifier of a tape node 1510, the client device 1515 is configured to retrieve information corresponding to the received identifier of the tape node. In an embodiment, the client device 1515 transmits a request comprising the identifier of the tape node 1510 to an IOT system 400. The IOT system 400 transmits audit results corresponding to the identifier of the tape node 1510 to the client device 1515. In other embodiments, the client device 1515 establishes a communication connection to the IOT system 400, accesses a database 1550 of the IOT system via the communication connection, and retrieves audit results corresponding to the received identifier of the tape node 1510. As illustrated in FIG. 15, the database 1550 comprises a plurality of entries describing audit results for a plurality of tape nodes of the IOT system 400. The entries comprise identifiers 1520 of each of the plurality of tape nodes and information describing whether a respective tape node has passed one or more diagnostic tests 1535. In some embodiments, the entries may further comprise information describing a timestamp or date 1525 of a last audit of a respective tape node and a percentage or fraction of diagnostic tests passed 1530 by the respective tape node. In other embodiments, the entries may comprise additional, less, or different information describing criteria or parameters of the audit, the diagnostic tests, and other factors of the performance of the tape node 1510.

In some embodiments, the client device 1515 is configured to determine, based at least in part on retrieved information from the database of the IOT system, whether the tape node 1510 is able to perform the assigned task. As discussed previously, in some embodiments the tape node 1510 may pass the audit and proceed to deployment responsive to passing at least a threshold number of diagnostic tests. In other embodiments the tape node 1510 may pass the audit and proceed to deployment responsive to passing at least a critical diagnostic test or a specified set of critical diagnostic tests. In other embodiments the tape node 1510 may pass the audit and proceed to deployment responsive to passing at least a specified set of diagnostic tests corresponding to a next assigned task. In some embodiments, the client device 1515 accesses rules or requirements for the assigned task stored in the cloud, a database, on another client device, from a gateway device, on the storage of the client device, some other source, or some combination thereof and determines whether the tape node 1510 is able to perform the assigned task based on the retrieved information from the database 1550 and the accessed rules or requirements.

As illustrated in FIG. 15, the client device 1515 may provide a user interface representing whether the tape node 1510 is able to perform the assigned task, comprising at least an identifier ("TAPE_004") for the tape node 1510 and a graphical element indicating that the tape node has passed or failed the audit for the assigned task. In some embodiments, the graphical element may use similar symbols as those discussed in conjunction with FIG. 14. In some embodiments, the user interface may comprise multiple identifiers and multiple corresponding graphical elements, e.g., showing identifiers and graphical elements corresponding to all tape nodes scanned during a session, showing identifiers and graphical elements corresponding to a set of most recently scanned tape nodes, or the like. In other embodiments, the graphical element may use other symbols, or may comprise additional or different information, such as text describing conditions or parameters of the tape nodes.

Figure 16A:
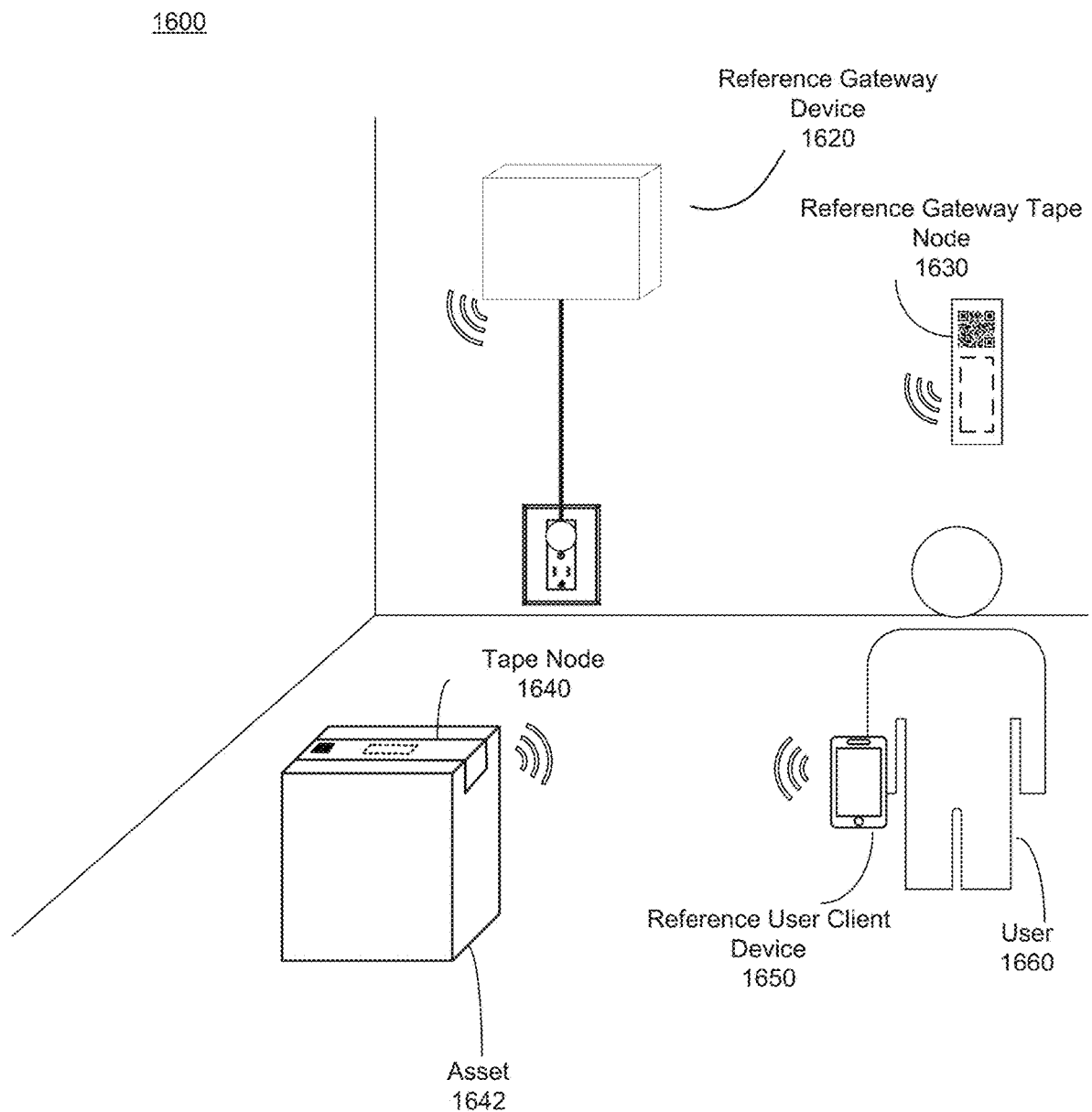
FIG. 16A shows an environment in which an audit of a tape node is performed, according to some embodiments.

FIG. 16A shows an environment in which an audit of a tape node is performed, according to some embodiments. The environment 1600 includes a tape node 1640 installed on an asset 1642 and a number of known reference devices in the environment 1600. The reference devices include a reference gateway device 1620, a reference gateway tape node 1630, and a reference user client device 1650. Each of the reference devices have a known location to the tracking system 400. The tape node 1640 may perform a self-diagnostic test associated with an audit in part by communicating with one or more of the reference devices, in some embodiments. The audit, in the example shown in FIG. 16A, occurs at a time of deployment for the tape node 1640. In other embodiments, the tape node 1640 has not yet been deployed or installed on the asset 1642, but has been activated at the time the audit is performed. In some embodiments, the tape node 1640 may be audited after deployment to determine if the tape node 1640 is still within the conditions for satisfactory operational performance. In other embodiments, one or more of the reference devices performs the diagnostic test of the tape node 1640 and reports the results to some combination of the tape node 1640, other wireless nodes of the tracking system 400, or a server of the tracking system 400. In some embodiments, the audit is initiated by one or more of the reference device which sends instructions to perform the diagnostic tests to the tape node 1640. In the example of FIGS. 16A and 16B, a diagnostic test includes testing a wireless antenna of the tape node 1640 by measuring a received signal strength of a wireless signal transmitted from one of the reference devices. The measured received signal strength is compared to an expected range for the received signal strength, and if the measured received signal strength is outside of the expected range, the auditing system determines that the tape node 1640 is not operational or requires further testing. The expected range for the received signal strength may be based at least in part on a known distance or estimated distance between the tape node 1640 and the corresponding reference device. While in the examples discussed herein, a tape node is audited, in some embodiments, a gateway device not having the adhesive tape platform form factor, a client device, or some other IOT device may be audited using the same system and methods.

In some embodiments, the tape node 1640 is activated, e.g., by cutting or separating the tape node 1640 from a strip or roll, but is not immediately installed on the asset 1642. The tape node 1640 may be placed in the environment 1600 where it initiates an audit for pre-deployment by communicating with one or more of the reference devices. Upon completing and passing the audit, the tracking system notifies a user that he tape node 1640 is ready to be installed on the asset and deployed with the asset. In the case of failing the audit, the tracking system notifies the user to collect or dispose of the tape node 1640 and activate a new tape node for deployment with the asset 1642. The notification may be presented to the user in a client device app, for example. In some embodiments, the tape node 1640 includes a display on the outside of the tape node 1640 that displays a health status or audit test result to the user.

FIG. 16B shows an example data table showing audit results for tape nodes including diagnostic test results for a wireless antenna of each of the tape nodes, according to some embodiments. The data table 1670 includes columns showing a device ID for each tape node, a corresponding reference device ID for the reference device used to measure the received signal strength indicator (RSSI) for diagnostic testing a corresponding tape node, the expected RSSI range for the communication between the corresponding reference device and the tape node, and a resultant health status of the corresponding tape node determined by the auditing system based on the measured RSSI and the expected RSSI range. In the example of FIG. 16B, malfunctioning tape nodes are assigned a red health status, tape nodes which may be malfunctioning and need further testing are assigned a yellow health status, and tape nodes which are operating at a satisfactory performance level are assigned a green health status. In some cases, where the diagnostic test has not yet completed or will take a duration of time longer than a threshold amount of time, the diagnostic test results may be deferred and a corresponding tape node may be assigned a deferred result status. Although FIG. 16B shows the green, yellow, red, and deferred result statuses being assigned to tape nodes, different statuses and a different number of statuses may be assigned to the tape nodes based on the results of the diagnostic test, according to some embodiments.

Figure 17:
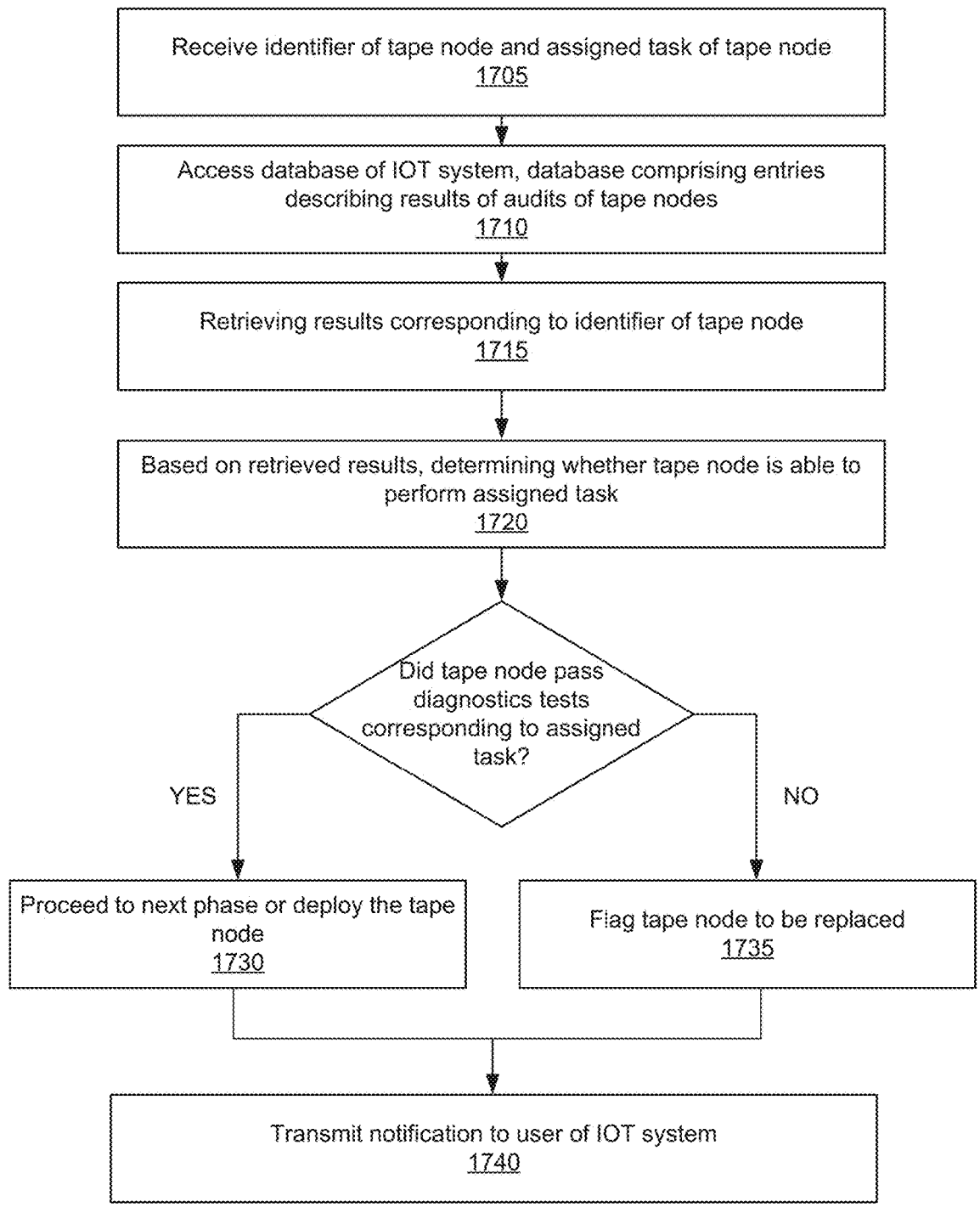
FIG. 17 is a flow diagram of a method for retrieving results of audits performed on tape nodes in an IOT system, according to some embodiments.

FIG. 17 is a flow diagram of a method for retrieving results of audits performed on tape nodes in an IOT system, according to some embodiments. A client device of an IOT system 400 receives 1605 an identifier of a tape node and an assigned task of the tape node. In some embodiments, the receiving comprises scanning, by the client device, a two-dimensional barcode 22, such as a QR code, of the tape node. In other embodiments, the receiving comprises receiving the identifier of the tape node as input by a user of the IOT system 400. The client device accesses 1610 a database of the IOT system 400. The database comprises a plurality of entries describing a plurality of tape nodes and audit results corresponding to each of the plurality of tape nodes. In other embodiments, the entries may additionally comprise information such as timestamps of audits and other parameters or conditions of the audits, tape nodes, and/or diagnostic tests. The client device 1615 retrieves audit results corresponding to the received identifier of the tape node.

Based at least in part on the retrieved audit results, the client device determines 1620 whether the tape node is able to perform the assigned task. In some embodiments, the determination is based at least in part on the tape node passing a specified set of diagnostic tests corresponding to the assigned task. In other embodiments, the determination is based at least in part on the tape node passing a critical diagnostic test or a set of critical diagnostic tests. In other embodiments, the determination is based at least in part on the tape node passing at least a threshold number of diagnostic tests.

Responsive to determining that the tape node is able to perform the assigned task, the client device determines 1630 that the tape node is able to proceed to the next phase or to deployment. Responsive to determining that the tape node is not able to perform the assigned task, the client device flags 1635 the tape node to be replaced for the assigned. In some embodiments, the client device may additionally flag the tape node to be recycled, refurbished, or recharged, or may flag the tape node as defective. The client device transmits 1640 a notification to a user of the IOT system with the results of the determination. The notification may comprise, for example, text or a graphical element identifying the tape node as passing the audit test and an instruction to proceed with deployment of the tape node, or may comprise text or a graphical element identifying the tape node as failing the audit test and an instruction to replace the tape node for the assigned task.

In the embodiment of FIG. 17, the steps described herein are performed by a client device of an IOT system. In other embodiments, one or more of the actions described herein may be performed by one or more other entities of the IOT system or in combination with one or more other entities of the IOT system. For example, in some embodiments one or more of the actions may be performed by a cloud or server of the IOT system. In other embodiments, the method of FIG. 17 may include additional or different steps, or may be performed in another order.

Blacklisting

In some embodiments, if an analysis of the auditing data reveals a trend in defective tape nodes, the IOT system 400 can blacklist groups of tape nodes based on the analysis. In one example, a high percentage (e.g., over 70%) of tape nodes in a first group fail a diagnostic test of their cellular communications system during remote audits. Based on data for the tape nodes accessed in the database, the IOT system 400 determines a common feature of the first group of tape nodes. The IOT system 400 may blacklist any tape node that includes the common feature. A blacklisted tape node is automatically identified as defective, according to some embodiments. A user or human operator of the IOT system is notified of the blacklisted e.g., through the interface 1400) and instructed not to use the blacklisted tape nodes. In other embodiments, the tape nodes that include the common feature are blacklisted only from tasks that require cellular communications. The tape nodes that are blacklisted in this case are not assigned tasks that require cellular communications. In an example, the first group share a common feature of a first manufacturer of a cellular communications antenna. The IOT system 400 determines this as the common feature, based on the data stored in the database which includes the manufacturer of the hardware components for each tape node. The IOT system 400 proceeds to blacklist every tape node in the IOT system 400 that has an antenna produced by the first manufacturer. Although the example discussed above is in reference to cellular communications system, the blacklisting may occur based on any diagnostic test and any common feature for a group of tape nodes, according to some embodiments.

Auditing without Disrupting a Workflow for Assets

Figure 18:
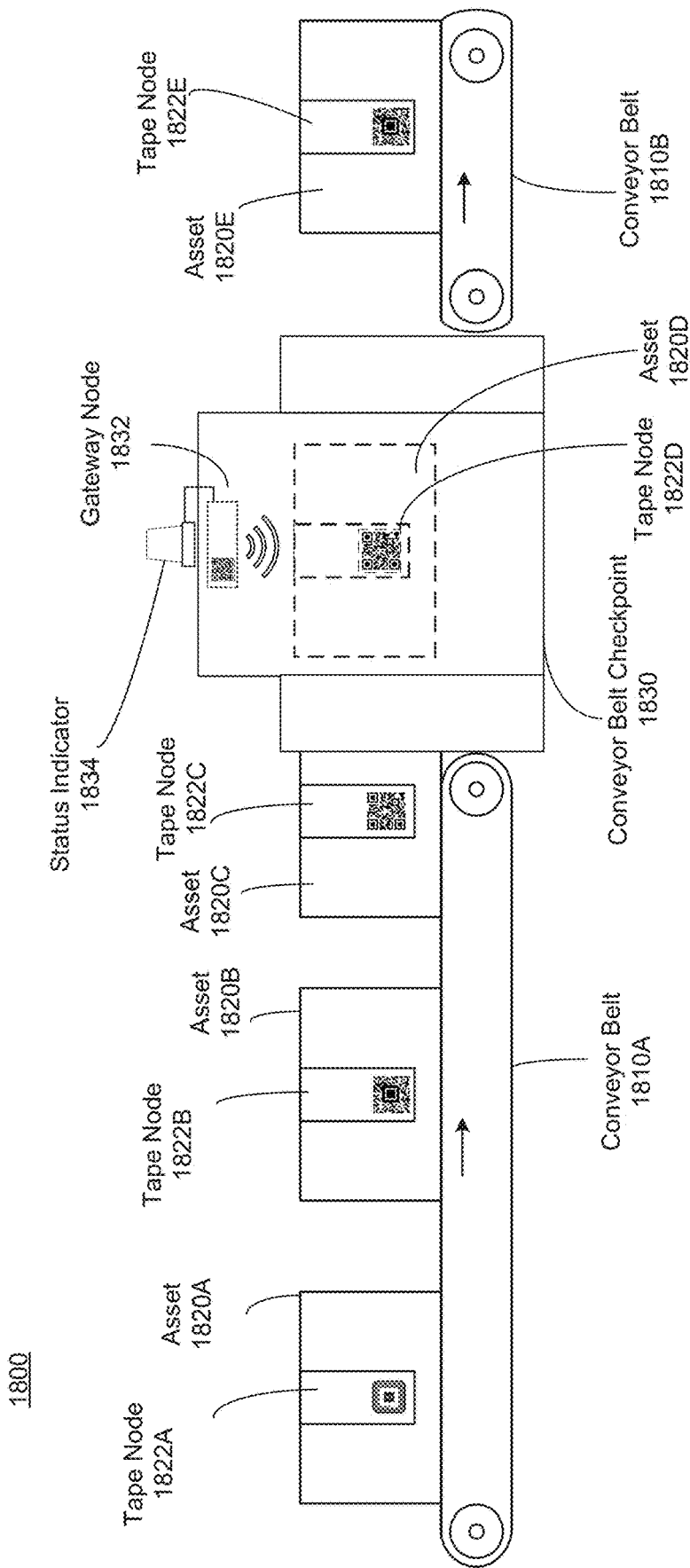
FIG. 18 is an example diagram of a conveyor belt system in which auditing of tape nodes on assets is performed as the assets are conveyed, according to some embodiments.

FIG. 18 is an example diagram of a portion of a conveyor belt system in which auditing of tape nodes on assets is performed as the assets are conveyed, according to some embodiments. The conveyor belt system includes conveyor belts, including the conveyor belts 1810A and 1810B in the portion of the conveyor belt system 1800. The assets 1820A, 1820B, 1820C, 1820D, and 1820E are collectively referred to herein as the "assets 1820." Similarly the tape nodes 1822A, 1822B, 1822C, 1822D, and 1822E installed on the assets are collectively referred to herein as "the tape nodes 1822." The assets 1822 are conveyed by the conveyor belts 1810A and 1810B through a checkpoint 1830. The checkpoint is a location or functional component of the conveyor belt system that includes a gateway node 1832 for communicating with each of the tape nodes 1822 and a status indicator 1834. In some embodiments, the checkpoint 1830 is an embodiment of a camera tunnel, as shown in further detail in FIG. 20.

The gateway node 1832 communicates with each of the tape nodes 1822 to retrieve the results of an audit performed on the tape node 1822D passing through the checkpoint. The gateway node 1832 receives either audit results data and determines a health status of the tape node 1822D in relation to performing a task assigned to the tape node 1822D or receives the health status directly from the tape node 1822D which has determined the health status itself. The gateway node 1832 is connected (either wirelessly or through a wired connection) to the status indicator 1834, and the status indicator displays the status of the tape node 1822D passing through the checkpoint 1830 at a given time. For example, the status indicator may be a light display that can emit different colored lights. The status indicator 1834 may then emit a colored light corresponding to the status of the tape node 1822D. The gateway node 1832 also sends an update to the tracking system for updating an auditing database of the tracking system stored in the cloud. In some embodiments, the gateway node 1832 connects with a user client device and notifies the user via a client device app of the status of one of the tape nodes 1822. This may be done in response to detecting a failing health status (such as the red health status, yellow health status, or deferred result health status shown in FIG. 16B).

In response to the status indicator displaying the status of the current tape node 1822D, a nearby user may divert or change the workflow of the asset 1820D to prevent the asset 1820 from exiting the conveyor belt system with a defective tape node 1822D installed. The tape node 1822D may be collected and replaced with a functional tape node, in some embodiments. Each of the tape nodes 1822 may have different components and software configurations, according to some embodiments. In some embodiments, the gateway node 1832 initiates the audit of the tape node 1822D, when the tape node 1822D is in wireless communication range (e.g., Bluetooth or BLE range) of the gateway node 1832. By the time the tape node 1822D reaches the checkpoint 1830, the tape node 1822D may have finished its self diagnostic tests associated with the audit. If it has not finished the self-diagnostic tests, it may transmit a notification to the gateway node 1832 that the self-diagnostic tests are not complete or will take more than a threshold period of time to complete. The tape node 1822D may be assigned or may assign itself the deferred result status, in response.

The status indicator 1834 may display the deferred results status. In further embodiments, the status indicator 1834 also includes an auditory alarm. The auditory alarm may sound in response to a corresponding health status of the tape node 1822D.

Figure 19A:
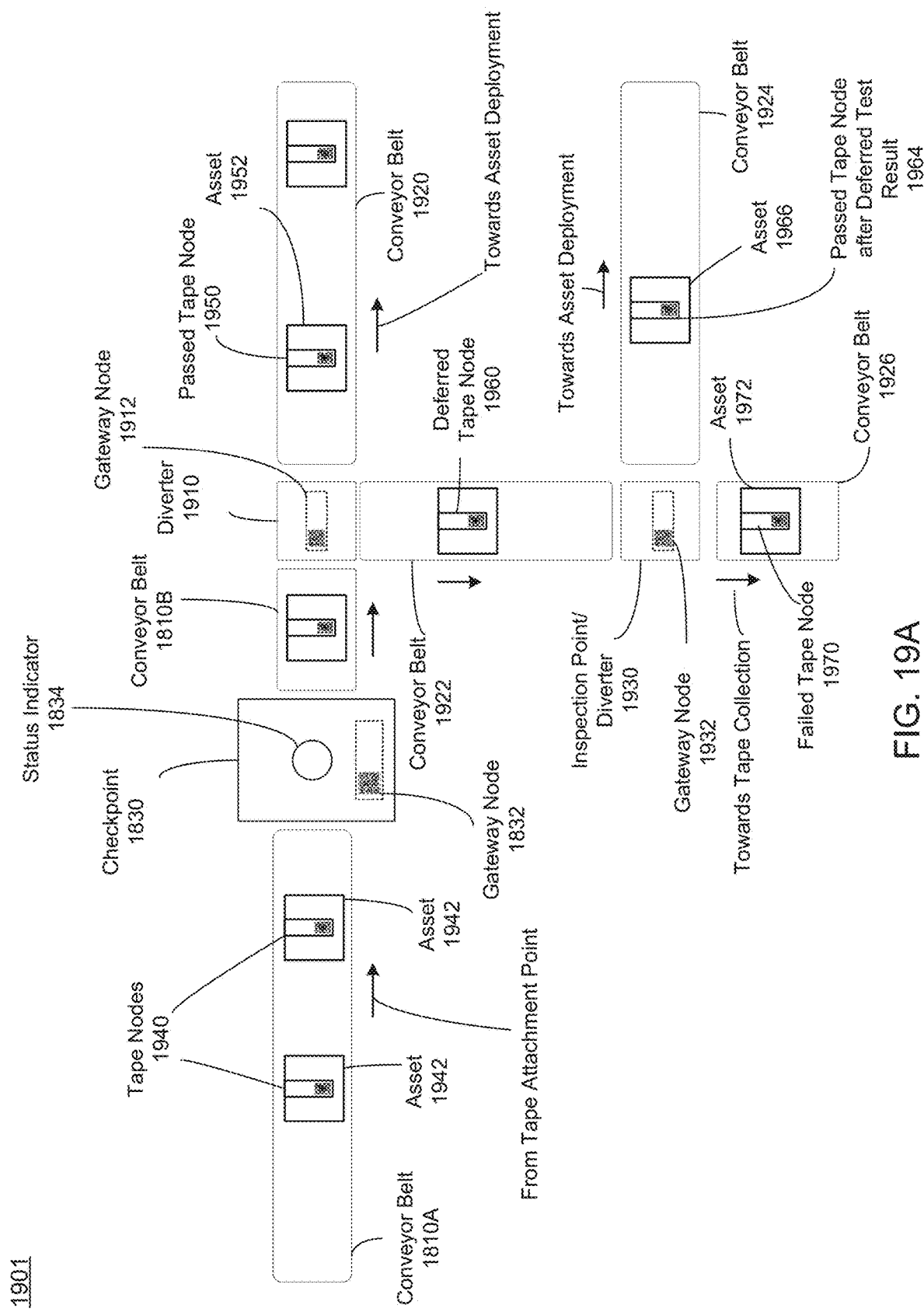
FIG. 19A is an example diagram of the conveyor belt system from an overhead perspective including a workflow for assets with tape nodes that have passed an audit, failed an audit, and have been assigned a deferred test status, according to some embodiment.

FIG. 19A is an example diagram of a portion of the conveyor belt system from an overhead perspective including a workflow for assets with tape nodes that have passed an audit, failed an audit, and have been assigned a deferred test status, according to some embodiment. The portion of the conveyor belt system 1901 includes the portion 1800 shown in FIG. 18. Each tape node that passes through the checkpoint 1830 stores its current health status on a memory of the tape node. When the tape node reaches a diverter 1910, it communicates with the gateway node 1912 to report its health status. In other embodiments, the gateway node 1832 reports the health status to the gateway node 1912 or the gateway node 1912 retrieves the health status from an updated database of the tracking system (e.g., on the cloud). The diverter diverts tape nodes which passed their respective audits, such as passed tape node 1950, to conveyor belt 1920 which conveys the associated assets, such as asset 1952, to a location for asset deployment. If the health status of a tape node is failed (e.g., red) or uncertain (e.g., yellow or deferred result), the associated tape node is diverted to the conveyor belt 1922 which conveys the associated asset to the inspection point or diverter 1930. In some embodiments, a manual inspection or a more extensive audit of the tape node is performed at the inspection point or diverter 1930. The inspection point or diverter 1930 includes a gateway node 1932 which retrieves the current health status of a tape node from some combination of the tape node, the gateway node 1832, the gateway node 1912, and the auditing database of the tracking system. If the retrieved status is a failed status, an associated asset, such as asset 1972 with its failed tape node 1970, is diverted to a conveyor belt 1926 which conveys the asset to a collection point for recovering the failed tape node and replacing the tape node. If the retrieved health status is a deferred result status, the asset may remain at the inspection point or diverter for a period of time until the diagnostic tests are complete, a manual inspection has been completed, or additional diagnostic tests are completed to confirm the status of the tape node. Once the status has been confirmed, the gateway node 1932 receives the confirmed status and diverts an associated asset to the conveyor belt 1926 if the confirmed status is a failed status. If the confirmed status is a passed status, the associated asset, such as asset 1966 with the passed tape node 1964, is diverted to a conveyor belt 1924 which conveys the asset to the location of deploying assets or conveys the asset to the conveyor belt 1920.

FIG. 19B is flow diagram of a method for performing audits on tape nodes associated with assets that are part of a workflow, according to some embodiments. The method 1903 includes requesting 1982 an audit of a tape node in a work flow, the audit associated with a task assigned to the tape node. The workflow may include steps that the asset undergoes prior to, during, or after deployment of the tape node on an associated asset. The audit may specifically test performance of the tape node corresponding to required conditions for completing a task assigned to the tape node. For example, the task may include tracking a location of the associated asset and may require conditions that a wireless antenna of the tape node performs above a threshold performance level. A notification is received 1984 that the audit result is not currently ready. In some embodiments, the notification includes details that the audit will take longer than a threshold period of time. In other embodiments, the notification includes a time when the audit results will be ready. The tracking system assigns 1986 the tape node a deferred status, in response, and logs the status in an auditing database. In some embodiments, the tape node assigns itself the deferred status and simply reports the assigned status to the auditing system.

In some embodiments, the asset is optionally placed 1988 in a waiting queue. Being placed in the waiting queue may include having the asset wait at a location until the audit results are ready. At a later time, the audit results are received 1990. Based on the audit result, the tape node's status is updated 1992 to a green status (i.e., a passed status) if the tape node passes the audit. The database entry for the tape node is updated to include the green status. Alternatively, if the tape node does not pass the audit, the tape node's status is updated 1994 to a red status (i.e., a failed status). The updated status is then transmitted 1996 to a user of the IOT system 400. For example, a status indicator may be used to display the status of the tape node or a notification may be transmitted to a user client device.

Figure 20:
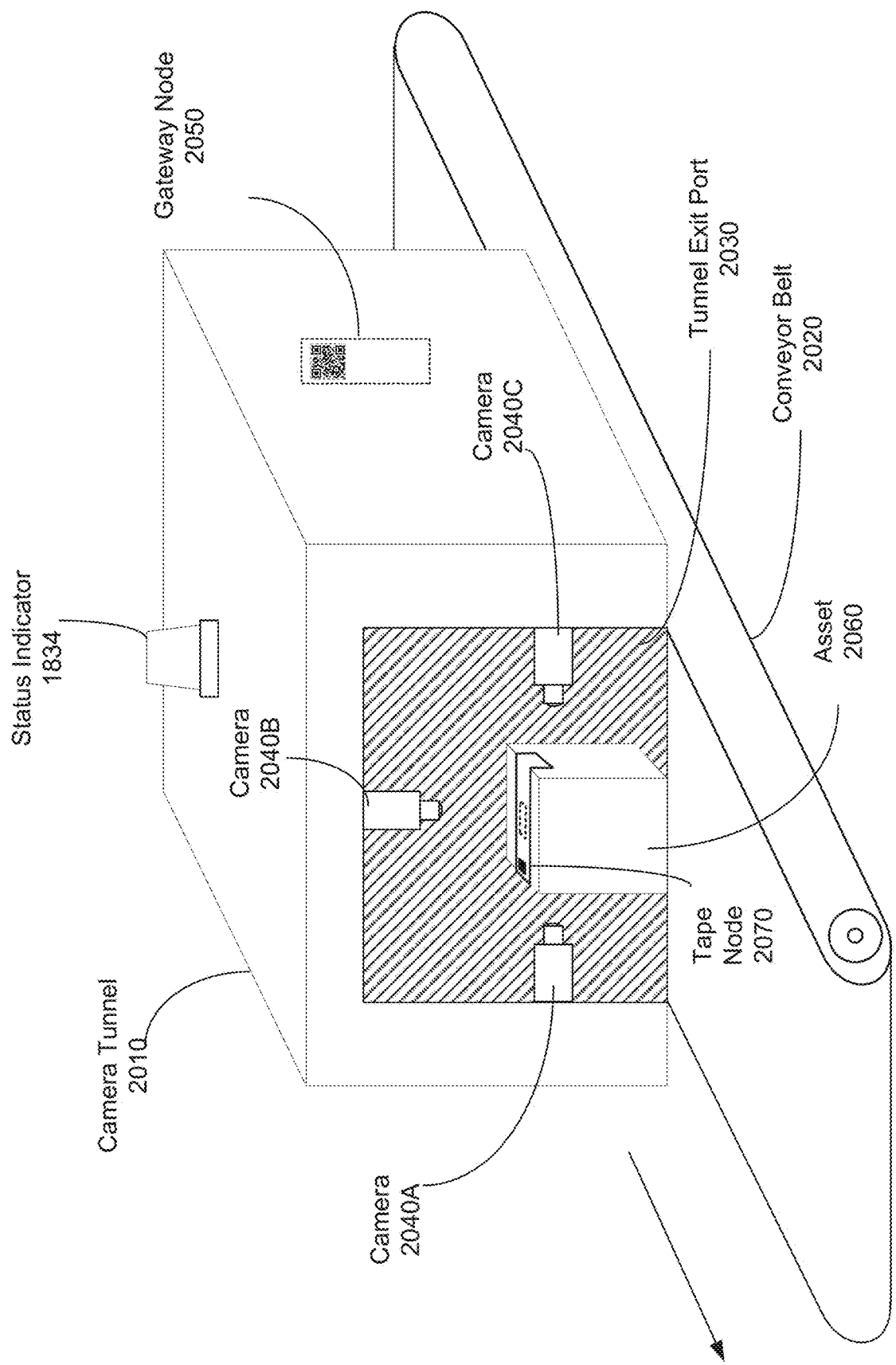
FIG. 20 is an example diagram of a camera tunnel used to identify and associate displayed codes on an asset with a tape node, as well as perform auditing of the tape node, according to some embodiments.

FIG. 20 is an example diagram of a camera tunnel used to identify and associate displayed codes on an asset with a tape node, as well as perform auditing of the tape node, according to some embodiments. The camera tunnel may be an embodiment of the checkpoint 1830 shown in FIGS. 18 and 19A. The camera tunnel includes a conveyor belt 2020 which conveys assets with tape nodes through the camera tunnel 2010 in through an entrance port (not shown) and out of an exit port 2030. While passing through the tunnel 2010, an array of cameras inside the tunnel including cameras 2040A, 2040B, and 2040C, referred to herein collectively as cameras 2040, capture images of the external surfaces of the asset. The array of cameras may include a different number of cameras shown in FIG. 20, such as fewer or additional cameras. The array of cameras may include multiple cameras 2040 with different orientations to capture different surfaces or portions of the asset 2060 when it is conveyed through the tunnel. The array of cameras may include cameras that have different orientations to the ones shown in FIG. 20, according to some embodiments.

The captured images are used to scan and decode any barcodes, QR codes, visible text, or other graphics displayed on a surface of an asset 2060 and on a tape node 2070 on the asset 2060. In some embodiments, a QR code on the tape node 2070 and one or more barcodes displayed on the asset (e.g., printed directly on the asset or on a label adhered to the asset) are scanned by the cameras 2040. The camera tunnel 2010 may include a computing device coupled to the cameras for processing the images for scanning the displayed information (e.g., the barcodes and QR codes). In other embodiments, the cameras 2040 are coupled to the gateway node 2050, either wirelessly or via a wired connection, and the gateway node 2050 performs the processing of the images. The gateway node 2050 receives the scanned QR code and the one or more barcodes and associates them. The gateway node 2050 may also wirelessly connect with the tape node 2070 and retrieve a tape node identifier and/or other data stored on the tape node 2070 and associates it with the barcodes and QR code. The gateway node 2050 then updates a tracking database on a server of the tracking system 400 with QR code, bar codes, and retrieved identifiers. The gateway node 2050 may also perform an audit of the tape node, including a test to compare the information displayed on the asset 2060 that is scanned by the array of cameras with expected information, as stored on the auditing or tracking database of the tracking system 400. For example, if the associated barcode displayed on the asset 2060 differs from a barcode that is assigned to the tape node 2070, the tape node 2070 may fail the audit and the asset 2060 may be diverted from the normal workflow.

Figure 21:
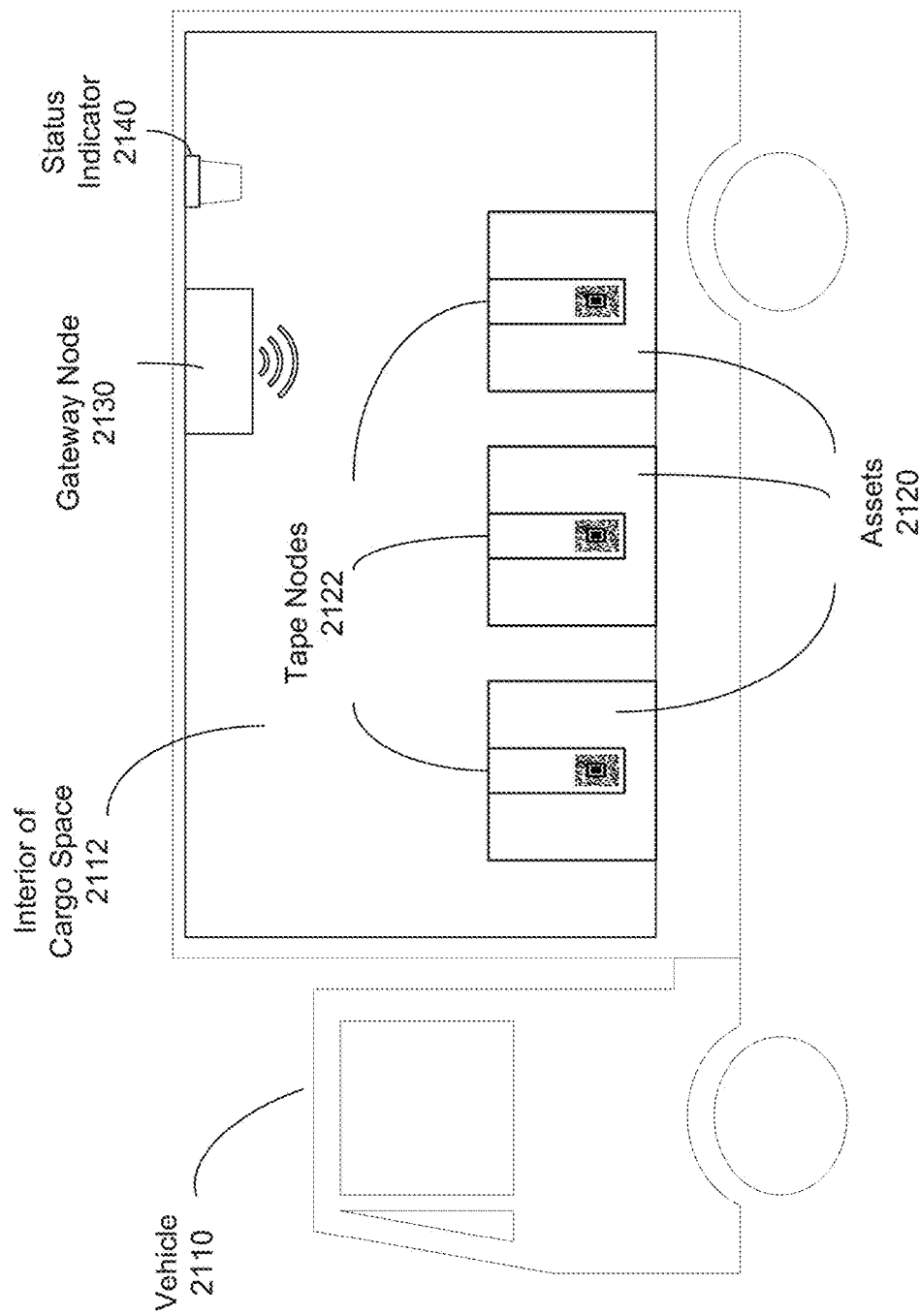
FIG. 21 is an example diagram showing an interior of a vehicle's cargo space including a system for performing audits of tape nodes on assets post deployment, according to some embodiments.

FIG. 21 is an example diagram showing an interior of a vehicle's cargo space including a system for performing audits of tape nodes on assets post deployment, according to some embodiments. The vehicle 2110 includes a gateway node 2130 and a status indicator 2140 on the interior of its cargo space 2112 for performing audits and displaying audit results. The vehicle 2110 may be carrying assets 2120 with associated tape nodes 2122. The gateway node 2130 may be configured to perform audits, initiate audits, and/or retrieve audit results from the tape nodes 2122. In cases of a failed audit for one or more of the tape nodes 2122, a user associated with the vehicle 2110, such as a driver, may be notified by the gateway device that one or more of the assets 2120 is not in condition for deployment outside of the vehicle. The notification may be displayed on the status indicator 2140 or may be transmitted to a user client device. Based on the notification, the user may take actions to deploy the asset outside of the vehicle, divert the asset, replace the asset, replace the tape node, or take other actions. The conditions for passing the audit, in some examples, includes detecting an ambient condition of the tape node using one or more sensors of the tape nodes 2122 or the vehicle 2110.

In one example, the assets 2120 need to be kept in cold storage while in the vehicle. If one or more of the tape nodes 2122 detects a temperature excursion above a threshold temperature while in the vehicle 2120 using a temperature sensor of one or more of the tape nodes 2122, the respective tape node may fail an audit. The asset associated with the failed tape node may then be disposed of by a user, instead of being delivered to a destination.

A status indicator may be a light display, such as a siren light or an array of colored lights, or it maybe a display panel which can display images, according to some embodiments. For example, the status indicator may include an LED display, an LCD display, an OLED display, an electronic paper display, or some other type of display. In some embodiments, a tape node may include a status indicator on the outside of the tape node which displays the current status of the tape node. Thus, a user may see the audit results for a tape node when the user handles or is near the tape node.

Database Validation

Figure 22A:
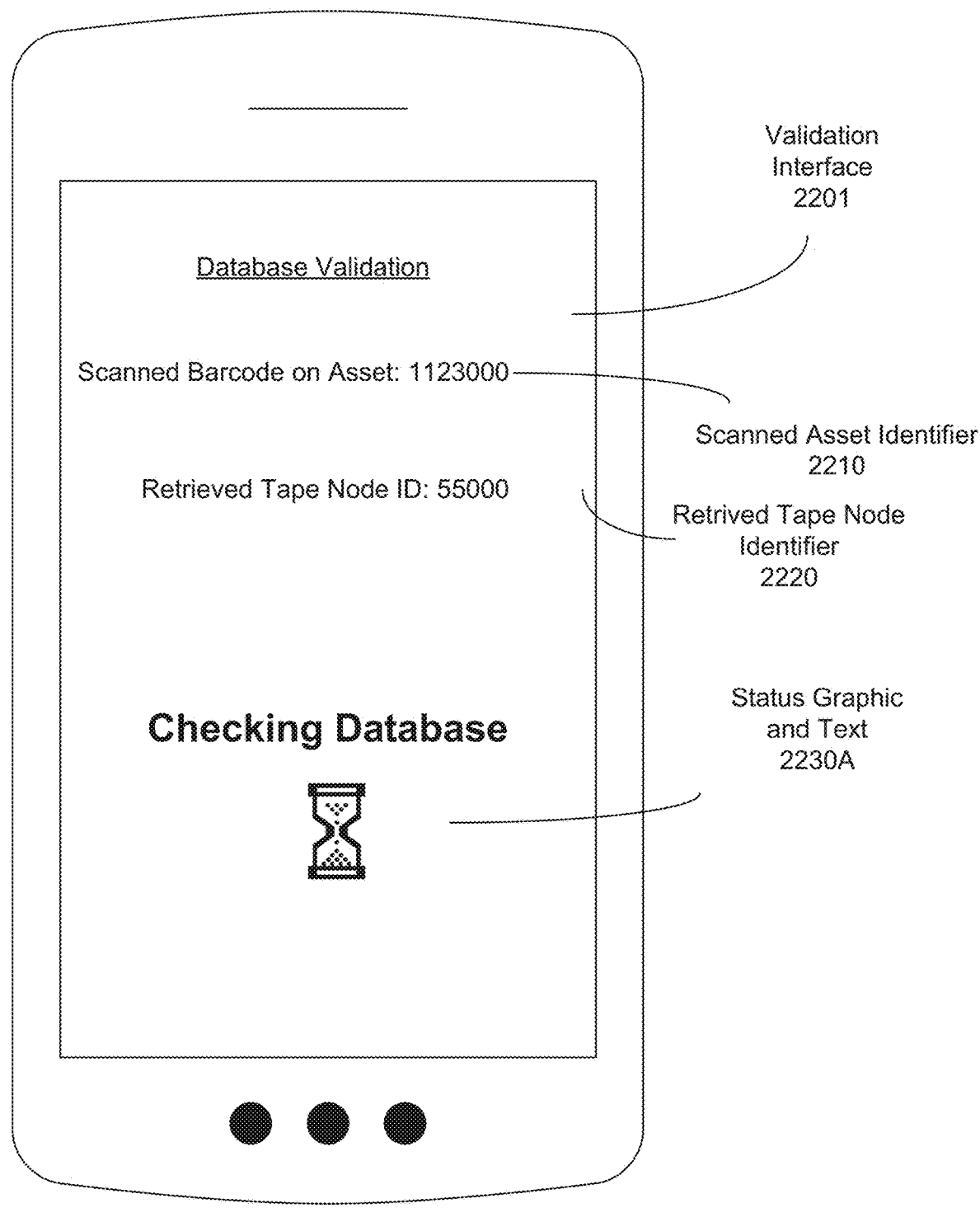
FIGS. 22A-22C are example diagrams showing a user interface for performing database validation of associated identifiers and codes using a client device, according to some embodiments.
Figure 22B:
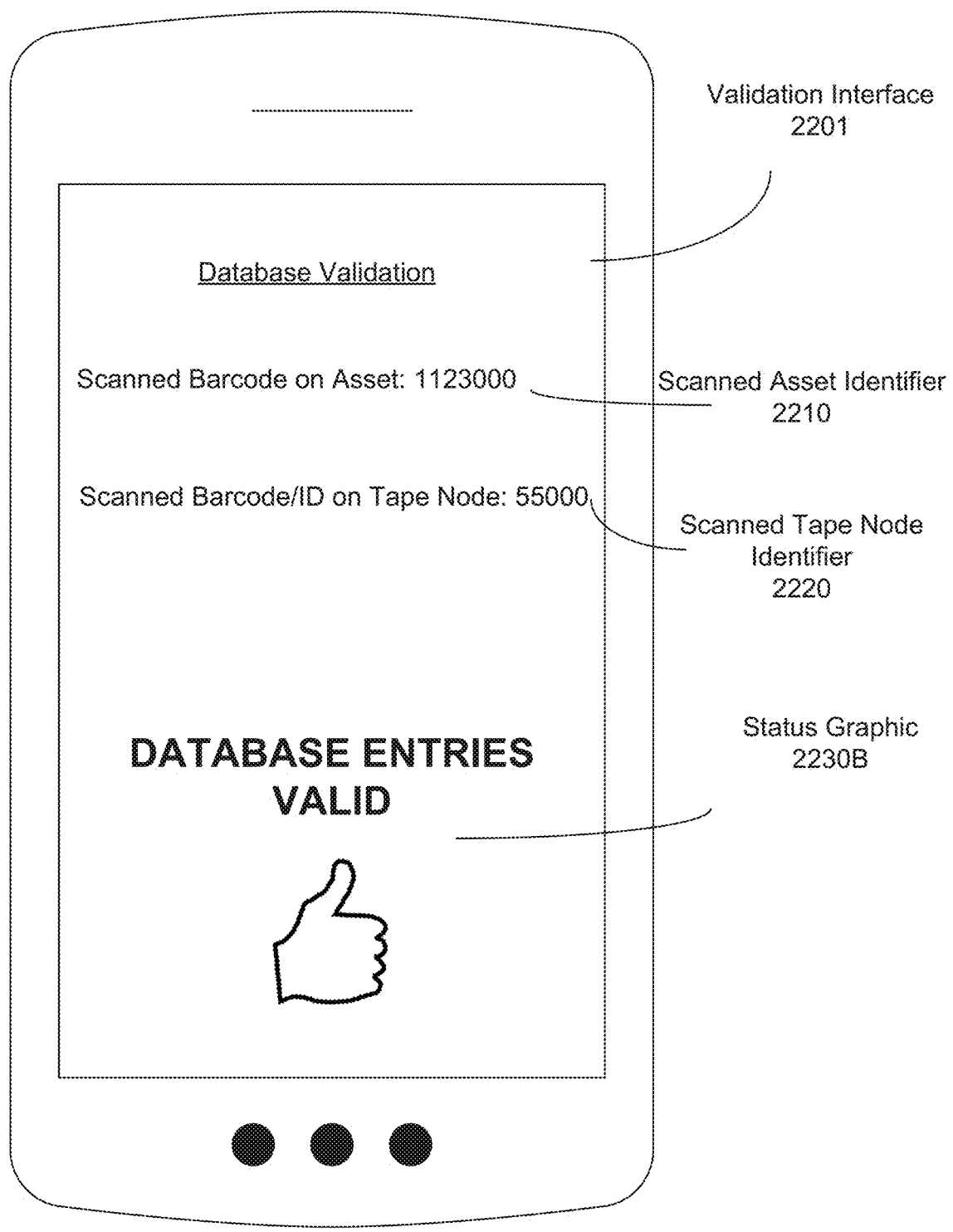
Figure 22C:
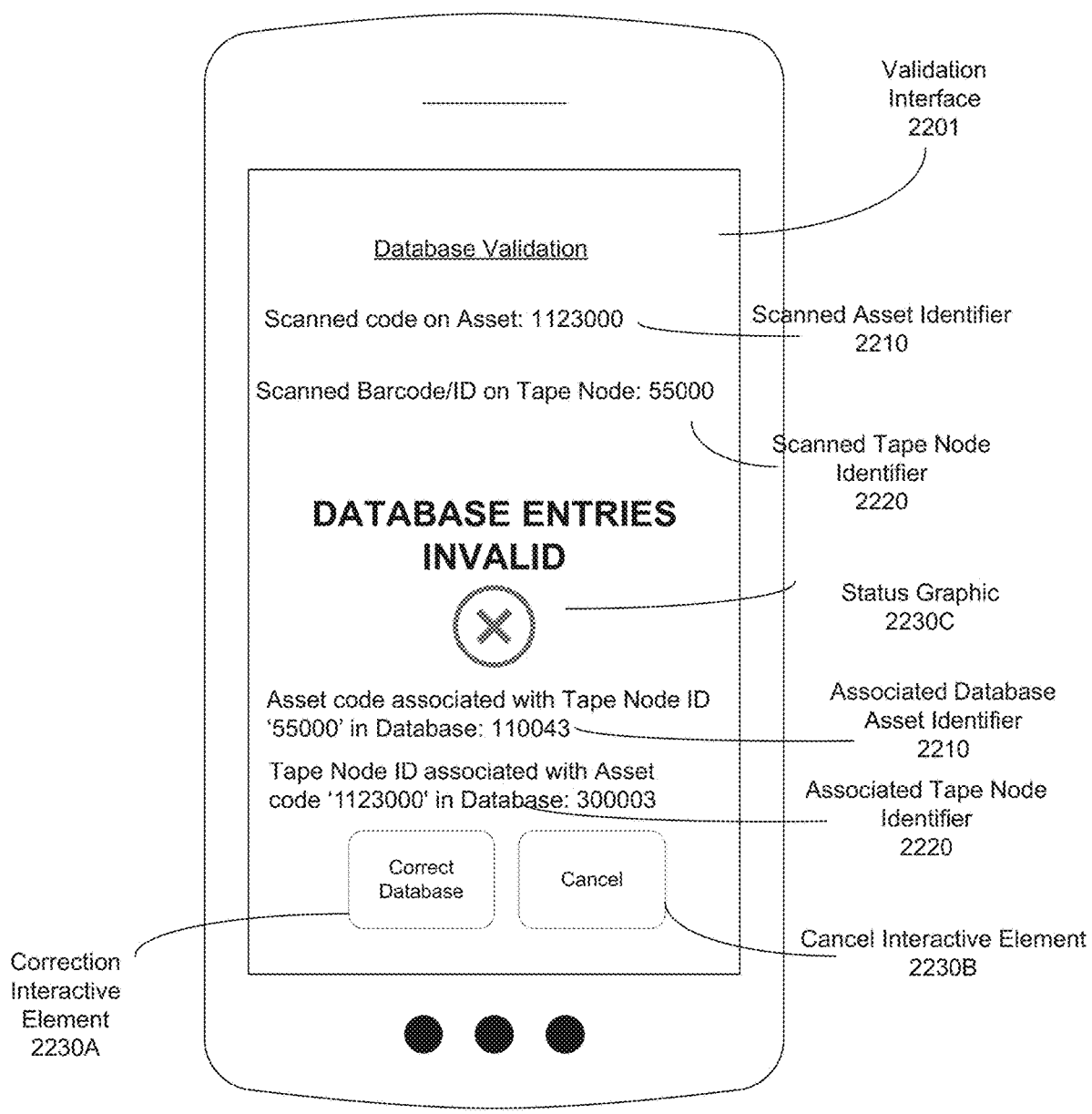

FIGS. 22A-22C are example diagrams showing a user interface for performing database validation of associated identifiers and codes using a client device, according to some embodiments. The client device is used by a user to perform diagnostic tests on a tape node and database validation for the tracking system's databases. In the example of FIGS. 22A-22C, a tape node identifier has been associated with a barcode, based on interactions performed by another user. The other user may have uploaded the identifier and the barcode using manual input or by scanning the barcode and identifier (via a QR code on the tape node) using a client device app for configuring the tape node. Upon receiving the upload, the tracking system 400 associates the barcode and the identifier in a tracking database. In some cases, the other user may have made a mistake in uploading the barcode and the identifier. For example, the user may have made a mistake in the input, or may have scanned an incorrect barcode or QR code.

The client device app for validation shown in FIGS. 22A-22C is used to validate the associated database entries and correct the database in the event of an error. The user may scan barcodes, QR codes, and/or text on an asset and retrieve a tape node identifier (either by receiving the identifier by wireless communication or by scanning a QR code displayed on the tape node) using the client device app for validation. Upon successfully retrieving the barcode on the asset and the identifier for the tape node, the validation interface 2201 is displayed to the user in the client device app.

As seen in FIG. 22A, the validation interface displays the scanned asset barcode 2210 and the retrieved tape node identifier 2220. While only two identifiers (the barcode and the tape node identifier) are shown in the examples of FIGS. 22A-22C, a different number of associated identifiers may be scanned and displayed for validation. The client device app then retrieves the identifiers associated with the asset identifier 2210 and the tape node identifier 2220 that are stored in the tracking database. The validation interface may display a status graphic and text 2230 that informs the user of the validation status. While the client device is retrieving the database entries the validation interface 2201 may display a waiting status 2230A, as in FIG. 22A, according to some embodiments.

If the identifiers retrieved from the database match the scanned barcode 2210 and retrieved tape node identifier 2220, the validation interface shows a validated status graphic and text 2230B, as shown in FIG. 22B, according to some embodiments. The client device app may then update an auditing database to confirm that the tape node 2220 has had its information properly uploaded to the tracking system database. If the identifiers retrieved from the database do not match the scanned barcode 2210 and the retrieved tape node identifier 2220, the validation interface 2201 may display an invalid status graphic and txt 2230C, as shown in FIG. 22C. The validation interface 2201 may also display the data retrieved from the tracking database such as the incorrect asset identifier 2210 associated with the tape node identifier 2220 in the tracking database and the incorrect tape node identifier 2220 associated with the scanned asset identifier 2210 in the database. In some embodiments, the validation interface also displays interactive elements for correcting the tracking database associations using the scanned identifiers 2210, 2220 and for exiting the validation interface 2201.

Computer Apparatus

Figure 23:
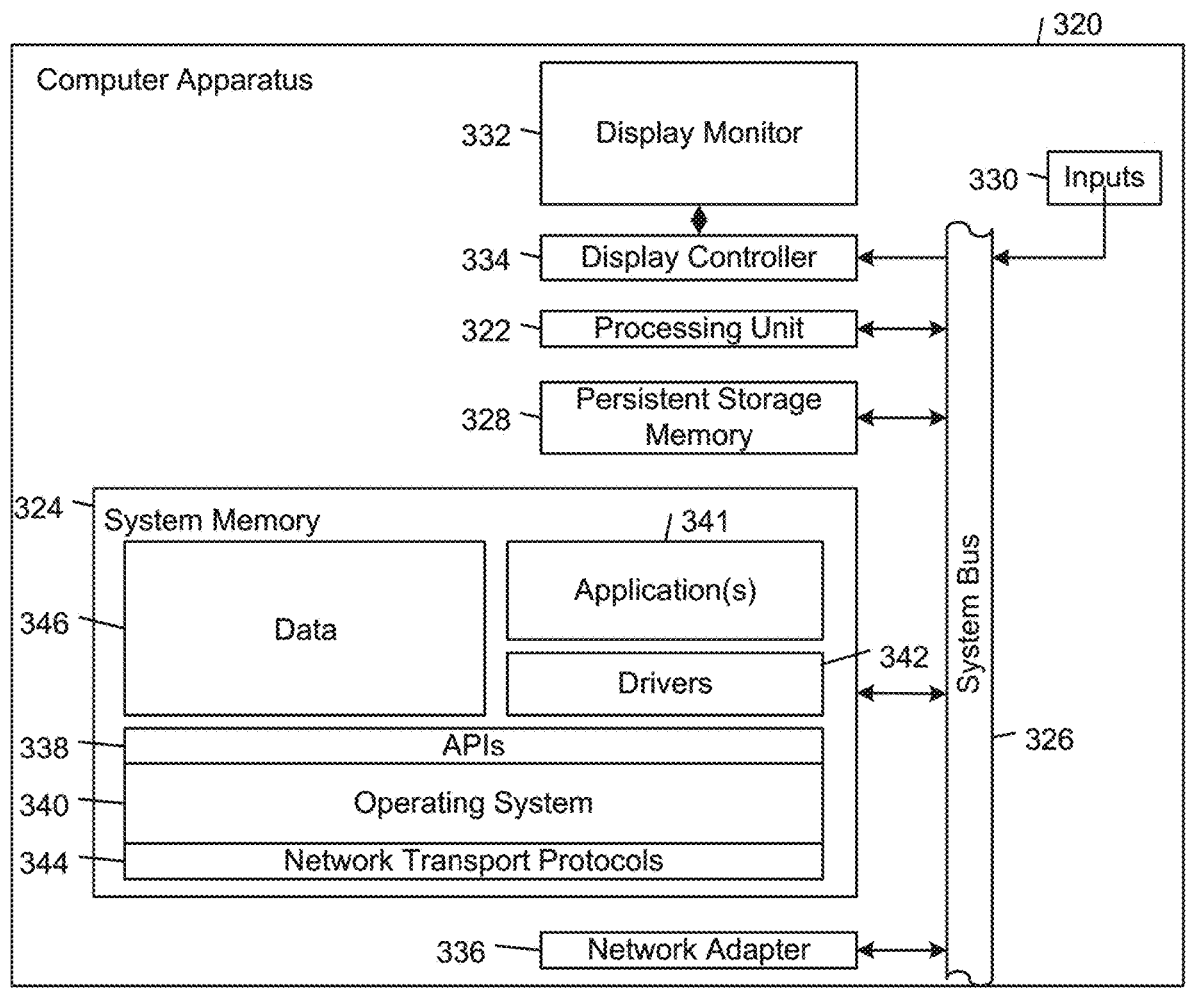
FIG. 23 shows an example embodiment of computer apparatus, according to some embodiments.

FIG. 23 shows an example embodiment of computer apparatus 320 that, either alone or in combination with one or more other computing apparatus, is operable to implement one or more of the computer systems described in this specification.

The computer apparatus 320 includes a processing unit 322, a system memory 324, and a system bus 326 that couples the processing unit 322 to the various components of the computer apparatus 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer apparatus 320, and a random access memory (RAM). The system bus 326 may be a memory bus, a peripheral bus or a local bus, and may be compatible with any of a variety of bus protocols, including PCI, VESA, Microchannel, ISA, and EISA. The computer apparatus 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A user may interact (e.g., input commands or data) with the computer apparatus 320 using one or more input devices 330 (e.g. one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer apparatus 320 also may include other input/output hardware (e.g., peripheral output devices, such as speakers and a printer). The computer apparatus 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows® operating system available from Microsoft Corporation of Redmond, Washington U.S.A.), software applications 341 including one or more software applications programming the computer apparatus 320 to perform one or more of the steps, tasks, operations, or processes of the locationing and/or tracking systems described herein, drivers 342 (e.g., a GUI driver), network transport protocols 344, and data 346 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising: a plurality of tape nodes, each tape node of the plurality of tape nodes assigned to perform a respective task and associated with an identifier; a client device configured to receive at least one identifier of a tape node of the plurality of tape nodes and to access a database of an internet of things (IOT) system to retrieve information corresponding to the at least one received identifier; and the database of the IOT system, the database comprising results of audits of the plurality of tape nodes, wherein the results of audits comprise information describing whether a respective tape node of the plurality of tape nodes has passed one or more diagnostic tests; wherein: the audits are based on-data collected using tape nodes of the plurality of tape nodes and according to the respective task, the audits are performed prior to deployment of the tape nodes of the plurality of tape nodes to implement the respective task.

2. The system of claim 1, wherein the database of the IOT system is populated based on audits performed on the one or more tape nodes at one or more of: a time of manufacture, a time of refurbishment, a time of recharging, or a time between a first transportation and a next transportation.

3. The system of claim 1, wherein the client device is configured to scan a barcode or QR code of each of the one or more tape nodes, the barcode or QR code comprising the identifier of the respective tape node.

4. The system of claim 1, wherein the client device is further configured to determine, based on retrieved information from the database of the IOT system, whether a respective tape node is able to perform the respective task.

5. The system of claim 1, wherein determining whether the tape node is able to perform the assigned task comprises determining that the tape node is not able to perform the assigned task and wherein a notification comprises an alert to the user of the IOT system to replace the tape node.

6. The system of claim 1, wherein determining whether the tape node is able to perform the assigned task comprises confirming-that the tape node is able to perform the assigned task and wherein a notification comprises an alert to the user of the IOT system to proceed with deployment of the tape node.

7. A method comprising: receiving, by a client device of a IOT system, an identifier of a tape node of the IOT system and an assigned task of the tape node; accessing, by the client device, a database of the IOT system, the database comprising a plurality of entries describing a plurality of tape nodes and results of audits corresponding to each of the plurality of tape nodes, the audits being based on-data collected using the plurality of test nodes and according to the assigned task; retrieving, by the client device, one or more of the results of audits corresponding to the identifier of the tape node; based at least in part on the retrieved one or more results of audits, determining, by the client device, whether the tape node is able to perform the assigned task; and prior to deployment of the tape node to perform the assigned task, transmitting, by the client device, a notification to a user of the IOT system, the notification comprising the results of the determination.

8. The method of claim 7, wherein the client device is a mobile phone.

9. The method of claim 8, wherein the client device accesses the database of the IOT system using a cellular data communication connection.

10. The method of claim 7, further comprising, displaying, by the client device, the notification on the client device.

11. The method of claim 7, further comprising: obtaining, by the client device, a first asset identifier associated with an asset or container being tracked by the tape node; comparing, by the client device, the first asset identifier to a second asset identifier retrieved from the database; and displaying, by the client device, a second notification indicating that the first asset identifier matches the second identifier or that the first asset identifier does not match the second identifier.

12. The method of claim 11, further comprising, responsive to the first asset identifier not matching the second identifier, overwriting the database entry corresponding to the second identifier with the first identifier.

13. The method of claim 7, further comprising: responsive to determining the tape node is unable to perform the assigned task, reassigning the task to a different tape node.

14. The method of claim 7, further comprising: responsive to determining the tape node is unable to perform the assigned task, diverting the tape node out of a workflow.

15. The method of claim 7, wherein the tape node is installed or attached to an asset being tracked by the tape node.

16. The method of claim 15, further comprising: responsive to determining the tape node is unable to perform the assigned task diverting the tape node and the asset out of a workflow.

17. A method comprising: receiving, by a client device of a IOT system, an identifier of a tape node of the IOT system and an assigned task of the tape node; activating a wake circuit of the tape node; in response to the activation of the wake circuit, performing an audit using the tape node using data generated using the tape node; determining, whether the tape node is able to perform the assigned task; prior to deployment of the tape node to perform the assigned task, transmitting a notification comprising the results of the determination.

18. The method of claim 17, further comprising, displaying the notification on a client device.

19. The method of claim 17, wherein the notification comprises an alert to a user of the IOT system to replace the tape node.

20. The method of claim 17, wherein the notification comprises an alert to a user of the IOT system to proceed with deployment of the tape node.

* * * * *